(12) United States Patent
Terashima

(10) Patent No.: US 6,385,232 B1
(45) Date of Patent: May 7, 2002

(54) SYNCHRONIZATION DETECTION DEVICE AND ITS METHOD

(75) Inventor: Kazuhiko Terashima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/270,112

(22) Filed: Mar. 16, 1999

(30) Foreign Application Priority Data

Mar. 18, 1998 (JP) ............................................ 10-068838

(51) Int. Cl.[7] .......................... H04B 15/00; H04K 1/00; H04L 27/30
(52) U.S. Cl. ...................... 375/149; 375/150; 375/152; 375/343; 370/515
(58) Field of Search .................................. 375/150, 152, 375/142, 143, 343, 149, 145, 367; 708/422, 425, 423, 424; 370/514, 515

(56) References Cited

U.S. PATENT DOCUMENTS

| | | | | |
|---|---|---|---|---|
| 5,790,588 A | * | 8/1998 | Fukawa et al. | ............. 375/200 |
| 5,910,948 A | * | 6/1999 | Shou et al. | .................. 370/335 |
| 5,914,943 A | * | 6/1999 | Higuchi | ...................... 370/320 |
| 5,930,290 A | * | 7/1999 | Zhou et al. | .................. 375/200 |
| 6,038,250 A | * | 3/2000 | Shou et al. | .................. 375/206 |
| 6,205,168 B1 | * | 3/2001 | Somayazulu | ................. 375/149 |

\* cited by examiner

*Primary Examiner*—Chi Pham
*Assistant Examiner*—Phuong Phu
(74) *Attorney, Agent, or Firm*—Jay H. Maioli

(57) ABSTRACT

Codes to be detected can be identified at high speed. The supply of the data shift clock ($D_{CLK1}$) to be given to the matched filter (82) is stopped at desired timing to hold the received signal (S10) and replica code generated at the correlation coefficient generator (83) is switched to the first, second or third replica code at desired timing to detect the correlation value of that time. Thereby, the second code, the third code and the first code are detected in order to detect the timing and the code type of the first code. Therefore, each correlation detection can be conducted at the same timing since the matched filter conducts the correlation detection at high speed holding the received signal and thus, the first code included in the received signal can be identified at higher speed than before.

14 Claims, 19 Drawing Sheets

FIG. 2 A (RELATED ART) LONG CODE
FIG. 2 B (RELATED ART) COMMON SHORT CODE
FIG. 2 C (RELATED ART) GROUP IDENTIFICATION SHORT CODE

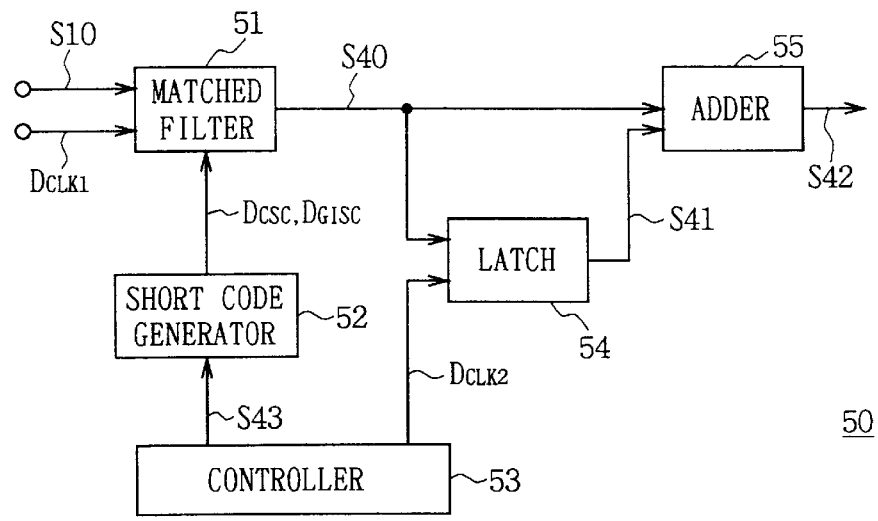
FIG. 10
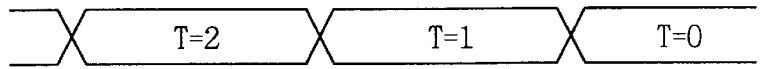
FIG. 11A S10
FIG. 11B $D_{CLK1}$
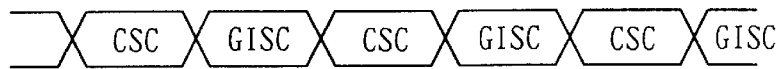
FIG. 11C $D_{CSC}$&$D_{GISC}$
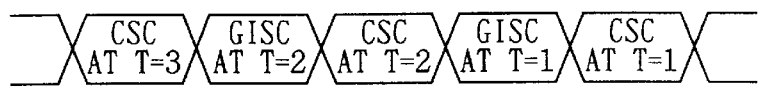
FIG. 11D S40
FIG. 11E $D_{CLK2}$
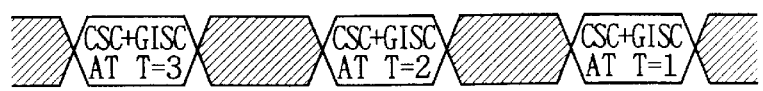
FIG. 11F S42

FIG. 13A $U_I, U_Q$ 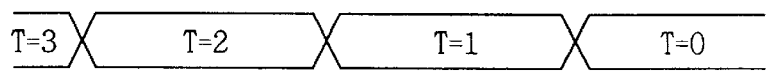
FIG. 13B $D_{CLK1}$ 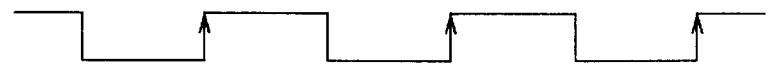
FIG. 13C $U_{IR}, U_{QR}$ 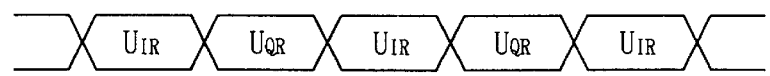
FIG. 13D S51 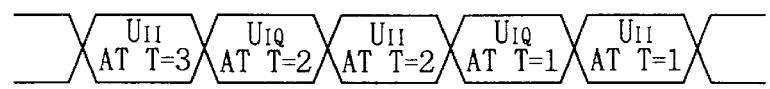
FIG. 13E S53 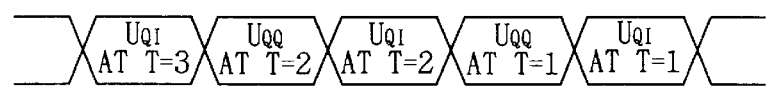
FIG. 13F $D_{CLK2}$ 
FIG. 13G $V_I$ 
FIG. 13H $V_Q$ 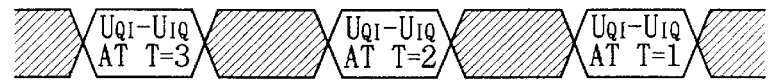
FIG. 13I S55 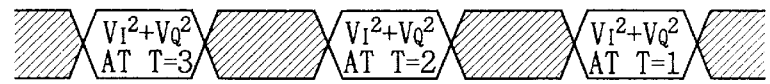

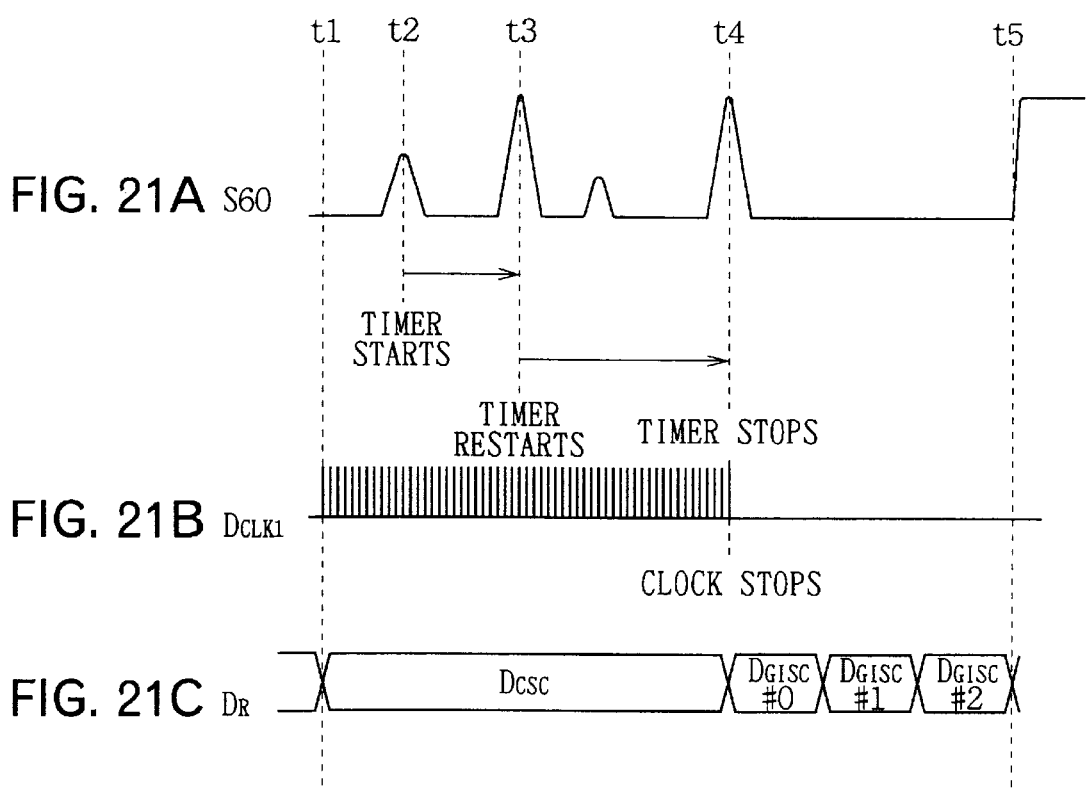

SYNCHRONIZATION DETECTION DEVICE AND ITS METHOD

BACKGROUND OF THE INVENTION

1. Field of the Invention

This invention relates to a synchronization detection device and its method, and more particularly, is suitably applied to a cellular radio communication system that allows asynchronous communication between base stations according to the direct sequence-code division multiple access (DS-CDMA) system.

2. Description of the Related Art

The DS-CDMA system is a multiplexing system using spread codes and its application to the cellular radio communication system has been vigorously under study as one of the radio access systems of the future mobile communication system. In the cellular radio communication system, an area to provide communication service is divided into cells with a desired size and a base station as a fixed station is provided in each cell and a communication terminal device which is a mobile station is connected by radio to the base station having the best communication state.

In such a cellular radio communication system, a method to search a base station to which the mobile station is connected is generally called a cell search. In this DS-CDMA cellular radio communication system, in order that the base stations use the same frequency, timing of spread code included in the received signal should be trapped simultaneously with this cell searching.

This cellular radio communication system using the DS-CDMA system can be classified into two types: a synchronous system between base stations in which temporal synchronization is performed among all base stations; and asynchronous system between base stations in which time synchronization is not conducted. Since the synchronous system between base stations is regulated by the IS-95 Standard, an absolute reference time is set in each base station using radio waves of the global positioning system (GPS) and thus, temporal synchronization will be performed among base stations. In this system, base stations transmit the same long code as the spread code at timing different from each other based on the absolute reference time. And thus, at the time of cell search, the mobile station can search the base station to be connected only by trapping the timing of a long code.

On the other hand, in the asynchronous system between base stations, base stations transmit a different long code in order to identify base stations, and accordingly, at the time of cell search, it is necessary for the mobile station to detect timing of the long code as well as the type of the long code. Therefore, in the case of asynchronous system between base stations, there is a problem that the time required for cell search becomes longer as compared with the synchronous system between base stations. However, as contrary to the above, in the asynchronous system between base station, since it is unnecessary to receive GPS radio wave, service area can be widened to areas where GPS radio wave can not reach. Therefore, if the cell search problem can be solved, this system is very effective.

As a method to speed up the cell search in the asynchronous system between base stations, several methods can be considered. One of these methods is that of transmitting a common short code among base station as well as a long code and a group identification short code to specify the long code group, and of detecting the timing and code type of the long code to be transmitted based on these short codes. In the following explanations, the method to detect the code timing and code type will be referred to as identification.

More specifically, the base station has a signal generation unit 1 of the control channel as shown in FIG. 1, and it forms transmission data in which long code, common short code and group identification short code are combined by using the signal generation unit 1, and transmits the transmission data through the control channel. At first, a first multiplier 2 sequentially spreads input information bit S1 having the value such as "1" with the common short code CSC having comparatively short cycle, that is common in each base station, and outputs spread data S2 to a second multiplier 3. In the second multiplier 3, long code LC having the longer cycle than the common short code CSC is entered and the spread data S2 is successively spread using the long code LC and the spread data S3 is output to an adder 5.

In this connection, this long code LC is very specific to every base station and base stations are identified by this long code LC. And a long code enable signal SCE is entered into AND circuit 4, and by setting this long code enable signal LCE to the level "L" at a fixed cycle, the long code LC to be supplied to the second multiplier 3 will be masked over the segment of level "L". Thus, the spread data S3 to be sent from the second multiplier 3 is not spread out in the long code LC over the segment on which long code enable signal LCE has the level "L". Hereinafter, the segment over which the long code LC is masked is referred to as masked segment.

On the other hand, group identification short code GISC, that shows the group of long codes LC to be used in the signal generation unit 1 and has the same cycle as the common short code CSC, is entered into the third multiplier 6. And this third multiplier 6 spreads out information bit S4 having such as the value "1" with this group identification short code GISC and outputs spread data S5 to the adder 5. In this connection, the spread data S5 will be formed on the masked segment of long code LC.

The adder 5, by adding these spread data S3 and S5, forms transmission data S6 for transmitting by the control channel. Thus, by transmitting this transmission data S6 by the control channel via the transmission circuit and antenna (not shown in FIG.), the transmission signal containing long code LC, common short code CSC and group identification short code GISC is be transmitted from the base station.

At this point, the timing of long code LC, common short code CSC and group identification short code GISC included in the transmission signal transmitted from the base station will be shown in FIGS. 2A to 2C. As shown in FIGS. 2A to 2C, common short codes CBC exist repeatedly in the transmission signal. Also long codes LC exist repeatedly in the transmission signal. However, the long code LC is masked just over the segment synchronized with the common short code CSC at the cycle $T_{MK}$. Moreover, in the masked segment of the long code LC, since the spread data S5 is added, group identification short code GISC exists over that masked segment.

In the case of receiving the transmission signal containing codes (CSC, GISC and LC) by the mobile station at the above timing and identifying the long code LC included in the transmission signal, firstly the common short code CSC existing over the masked segment is detected from the received signal to detect the timing of long code LC. When it is detected, the type of group identification short code GISC existing over the masked segment is determined. In this case, the group identification short code GISC shows the group of long code LC included in the received signal, and if the type of group identification short code GISC can be identified, the candidate of long code LC can be specified to that group.

Accordingly, after the group identification short code GISC is determined, the type of long code LC included in the received signal can be identified by narrowing down the candidate onto the long code LC in the group which the group identification short code GISC indicates and sequentially confirming whether these are candidates or not. With this arrangement, since the number of candidates can be decreased by the group identification short code GISC, the time required to judge the type of long code LC can be shortened as compared with the case of making all long codes LC as candidates.

At this point, the synchronization detection device to identify long code LC included in the received signal according to the above method will be shown in FIG. 3. In this FIG. 3, 10 generally shows a synchronization detection device to be provided in the mobile station, receiving the received signal S10 received via an antenna and a receiver (not shown in FIG.), and as well as detecting the timing of long code LC having the strongest signal level included in the received signal S10, it determines the type of that long code LC. More specifically, at the time of cell search, this judges the base station by determining the timing and code type of the long code LC having the strongest signal level.

At first, the matched filter 11 detects the correlation values between the received signal S10 and the replica code $D_{CSC}$ of the common short code CSC generated at the short code generator 12 in succession and stores the correlation value data S11 in a memory 13. The matched filter 11 detects the correlation value at least over the period of approximately three cycles of long code cycle.

The maximum correlation detection circuit 14 reads out the correlation value data S11 stored in the memory 13 and detects the data having the largest correlation value among the data S11. And assuming the timing at which the largest correlation value is obtained as the timing of long code LC having the strongest signal level included in the received signal S10, the maximum correlation detection circuit 14 outputs timing information S12 showing that timing. This timing information S12 is transmitted to the short code generator 12 and the long code generator 15 as the timing information S12 to generate replica code of the group identification short code GISC and replica code of the long code LC. Moreover, the maximum correlation detection circuit 14 outputs the detected correlation value data S13 having the largest value to a threshold determining circuit 18.

When the short code generator 12 receives the timing information S12, it generates replica code $D_{GISC}$, that is the first candidate in the plural number of group identification short codes GISC at the timing shown by the timing information S12 and outputs the code $D_{GISC}$ is to a sliding correlator 17 via a multiplier 16.

On the other hand, the threshold determining circuit 18 determines the first threshold value for determining the type of group identification short code GISC and the second threshold value to determine the type of long code LC based on the correlation value data S13 and outputs these to a judging unit 19 as the threshold data S14.

The sliding correlator 17 successively multiplies the replica code $D_{GISC}$ of the group identification short code GISC by the input received signal S10 and by integrating the multiplication result for 1 cycle of the replica code $D_{GISC}$, calculates the correlation value and outputs the correlation value data S15 to the judging unit 19.

The judging unit 19 judges whether the correlation data S15 transmitted from the sliding correlator 17 exceeds the first threshold value or not, and if it does not exceed the first threshold value, the control signal S16 is output to the short code generator 12, and causes this short code generator 12 to generate replica code $D_{GISC}$, that is the next candidate of the group identification short code GISC. Thus, the replica code $D_{GISC}$ of the group identification short code GISC is to be generated by the short code generator 12 in succession and the correlation value data S15 of that replica code $D_{GISC}$ is obtained successively by the sliding correlator 17.

On the contrary, if the correlation value data S15 transmitted from the sliding correlator 17 exceeds the first threshold value, the judging unit 19 judges that the then replica code $D_{GISC}$ is the group identification short code GISC showing the group of long codes LC to be detected and outputs the group shown by that group identification short code GISC to the long code generator 15 as group information S17. Also, in the case where the correlation value data S15 exceeds the first threshold value, the judging unit 19 outputs a control signal S18 to the short code generator 12 and causes the short code generator 12 to generate replica code $D_{CSC}$ of the common short code CSC.

When the long code generator 15 receives the group information S17, it generates replica code $D_{LC}$ that is the first candidate of the long code LC in the group which the group information S17 idicates at the timing shown by timing information S12. This replica code $D_{LC}$ of the long code LC is entered into the sliding correlator 17 after being multiplied by replica code $D_{CSC}$ of the common short code CSC in the multiplier 16.

The sliding correlator 17 successively multiplies the input received signal S10 by the replica code $D_{LC}$ of the long code LC which has been multiplied by the replica code $D_{CSC}$ of the common short code CSC and by integrating the multiplication result for 1 cycle of replica code $D_{LC}$, calculates the correlation value and outputs the correlation value data S19 to the judging unit 19.

The judging unit 19 judges whether the correlation value data S19 output from the sliding correlator 17 exceeds the second threshold value or not, and if it does not exceed, a control signal S20 is output to the long code generator 15, and causes this to generate the next candidate of the long code LC, i.e., replica code $D_{LC}$. Thus, the judging unit 19 causes the long code generator 15 to generate replica code $D_{LC}$ of the long code LC in succession and obtains the correlation value data S19 of that replica code $D_{LC}$ by the sliding correlator 17.

On the contrary, in the case where the correlation value data S19 to be sent out from the sliding correlator 17 exceeds the second threshold value, the judging unit 19 judges the then replica code $D_{LC}$ as the long code LC to be detected and outputs information S21 showing the type of the long code LC. Accordingly, this synchronization detection device 10, at the first stage, by detecting the common short code CSC, detects the timing of the long code LC having the strongest signal level in the received signal. At the following second stage, the judging unit 19 identifies the group identification short code GISC included in the received signal to detect the group of long code LC to be detected, and at the third stage, it determines the type of long code LC by making the long code LC in that group as a candidate. Thus, in this synchronization detection device 10, the long code LC having the strongest signal level included in the received signal can be identified.

At this point, the construction of matched filter 11 for detecting the correlation value of the common short code CSC shown in FIG. 3 will be shown in FIG. 4. Since generally the received signal S10 is the quadrature-phase-shift-keying (QPSK)-modulated, in practice the matched filter 11 has the 4-phase construction as shown in this FIG. 4. First, in the matched filter 11, the received signal S10 is entered into multipliers 20 and 21. in the multiplier 20, carrier signal 826, which is generated by delaying the carrier signal S25 generated in the oscillator 22 by $\pi/2$ with the phase-shifter 23, is entered. The multiplier 20, by multiplying this carrier signal S26 by the received signal S10, takes out signal element SI of the in-phase element I in the received signal S10. This signal element SI of the in-phase element I, after its unnecessary element is eliminated through the low-pass filter 24, is entered into an analog-to-digital converter 25 to be converted to digital in-phase data $U_I$.

On the other hand, the carrier signal S25 generated in the oscillator 22 is entered into the multiplier 21. The multiplier 21, by multiplying the carrier signal S25 by the received signal S10, takes out a signal element SQ of the quadrature element Q included in the received signal S10. This signal element SQ of the quadrature element Q, after its unnecessary element is eliminated through the low-pass filter 24, will be entered into an analog-to-digital converter 27 and digital conversion is applied here And converted to digital quadrature data $U_Q$.

Correlators 28 to 31 are matched filters for detecting the correlation value per each signal element. Of replica code $D_{CSC}$ of the common short code CSC to be transmitted from the short code generator 22, the in-phase data $U_I$ and the replica code $U_{IR}$ of in-phase element are entered into the correlator 28 and the correlator 28 calculates the correlation value $U_{II}$ ($=U_I * U_{IR}$) between the in-phase data $U_I$ and the in-phase element replica code $U_{IR}$, and outputs this to an adder 32.

Furthermore, in the correlator 29, the in-phase data UI and the orthogonal element replica code $U_{QR}$ of replica code $D_{CSC}$ of the common short code CSC to be transmitted from the short code generator 12 are entered. The correlator 29 calculates the correlation value $U_{IQ}$ ($=U_I * U_{QR}$) between the in-phase data $U_I$ and the quadrature element replica code $U_{QR}$ and outputs this to a differentiator 33.

Similarly, in the correlator 30, the above-mentioned quadrature data $U_Q$ and the replica code $U_{QR}$ of the quadrature element are entered. The correlator 30 calculates the correlation value $U_{QQ}$ ($=U_Q * U_{QR}$) between the quadrature data $U_Q$ and quadrature element replica code $U_{QR}$, and outputs this to the adder 32. Moreover the above-mentioned quadrature data $U_Q$ and the in-phase element replica code $U_{IR}$ are entered in the correlator 31 to calculate the correlation value $U_{QI}$ ($=U_Q * U_{IR}$) between the quadrature data $U_Q$ and the in-phase element replica code $U_{IR}$ and output this to the differentiator 33.

The adder 32 adds up the correlation value $U_{II}$ and the correlation value $U_{QQ}$ and outputs the sum to a square-law circuit 34. On the other hand, the differentiator 33 calculates the difference between the correlation value $U_{QI}$ and the correlation value $U_{IQ}$ and outputs the difference to a square-law circuit 35. Thus, the sum and the difference are squared by square-law circuits 34 and 35 respectively and by adding the squared result by an adder 36, finally the correlation value data S11 ($=(U_{II}+U_{QQ})^2+(U_{QI}-U_{IQ})^2$) to the replica code $D_{CSC}$, is calculated.

According to the identification method of long code LC as described above, the timing detection processing of long code LC using the common short code CSC, the group identification processing of long code LC using the group identification short code GISC and the identification processing of long code LC focussing the candidate onto the identified group are conducted in time series using the matched filter and the sliding correlator, and basically each processing is conducted at different timing. When the condition of transmission path changes due to, for example, fading, there is the possibility that the long code LC cannot be identified. Thus, according to the identification method described above, this possibility is avoided by extending the identification period of the long code LC such as detecting the correlation values of the overall long codes LC, but it causes the inconvenience of taking time when identifying long codes LC.

SUMMARY OF THE INVENTION

In view of the foregoing, an object of this invention is to provide a synchronization detection device which can accurately identify codes to be detected at high speed and can minimize the circuits.

The foregoing object and other objects of the invention have been achieved by the provision of a synchronization detection device for receiving a signal containing the first code, the known second code to detect the timing of the first code and the third code to specify the group of the first code and for detecting the timing and code type of the first code included in the received signal. The synchronization detection device comprises a matched filtering means for receiving the first, the second or the third replica code corresponding to the first, the second or the third code and detecting the correlation value between the first, the second or the third replica code and the received signal as well as capturing the received signal based on the data shift clock to be supplied; a correlation coefficient generation means for generating the first, the second or the third replica code and supplying it to the matched filtering means; and a control means for stopping the supply of data shift clock at the desired timing and causing the matched filtering means to hold the received signal, switching the replica code to be generated at the correlation coefficient generation means to the first, the second or the third replica code at desired timing and detecting the then correlation value, and thereby detecting the second code, the third-code and the first code successively and detecting the timing and code type of the first code.

Thus, the data shift clock to be given to the matched filtering means is stopped at desired timing and the received signal is held, and the replica code generated at the correlation coefficient generation means is switched to the first, the second or the third replica code at desired timing to detect the then correlation value. Thereby, the second code, the third code and the first code are successively detected and the timing and code type of the first code are detected. Therefore, the matched filtering means can conduct the correlation detection at high speed holding the received signal and each correlation detection can be conducted at approximately the same timing, and thereby the first code included in the received signal can be identified at high speed as compared with the conventional device.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 10 is a block diagram showing the construction of a short code correlation detection device according to the first embodiment;

FIGS. 11A to 11F are timing charts explaining the correlation value calculation timing according to the first embodiment;

FIGS. 13A to 13I are timing charts explaining the correlation value calculation timing according to the first embodiment;

FIGS. 21A to 21C are timing charts explaining the detection timing up to the group identification.

DETAILED DESCRIPTION OF THE EMBODIMENT

Figure 1:
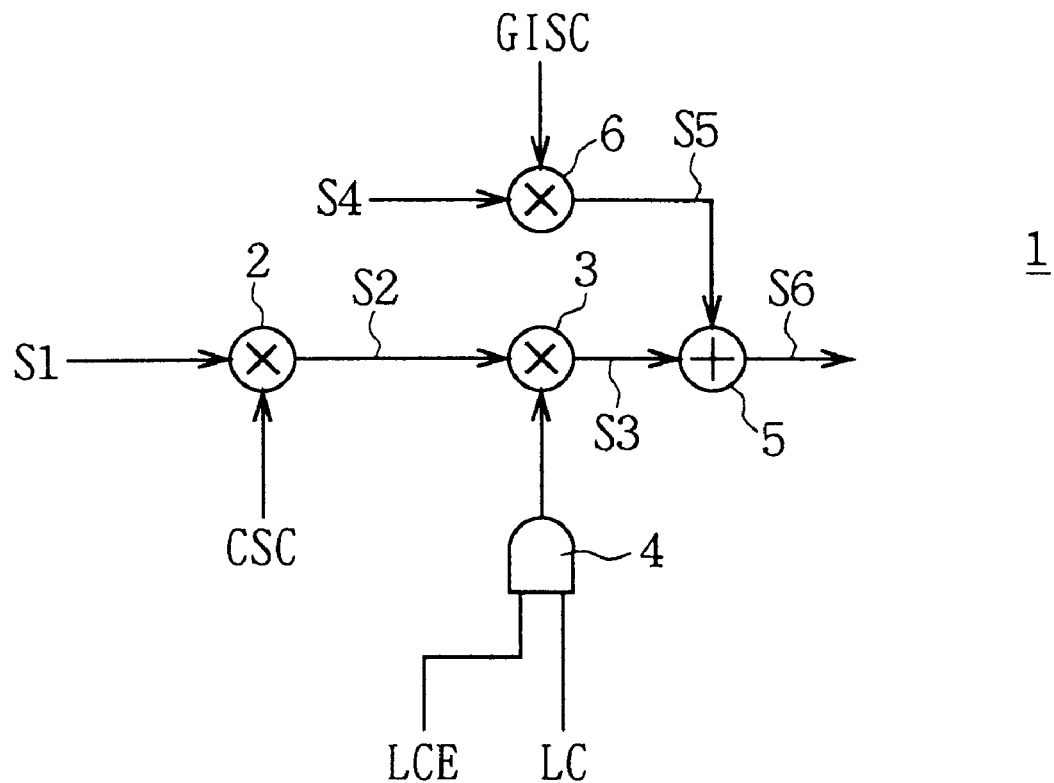
FIG. 1 is a block diagram showing the signal forming unit of the control channel provided in the base station.
Figure 2:
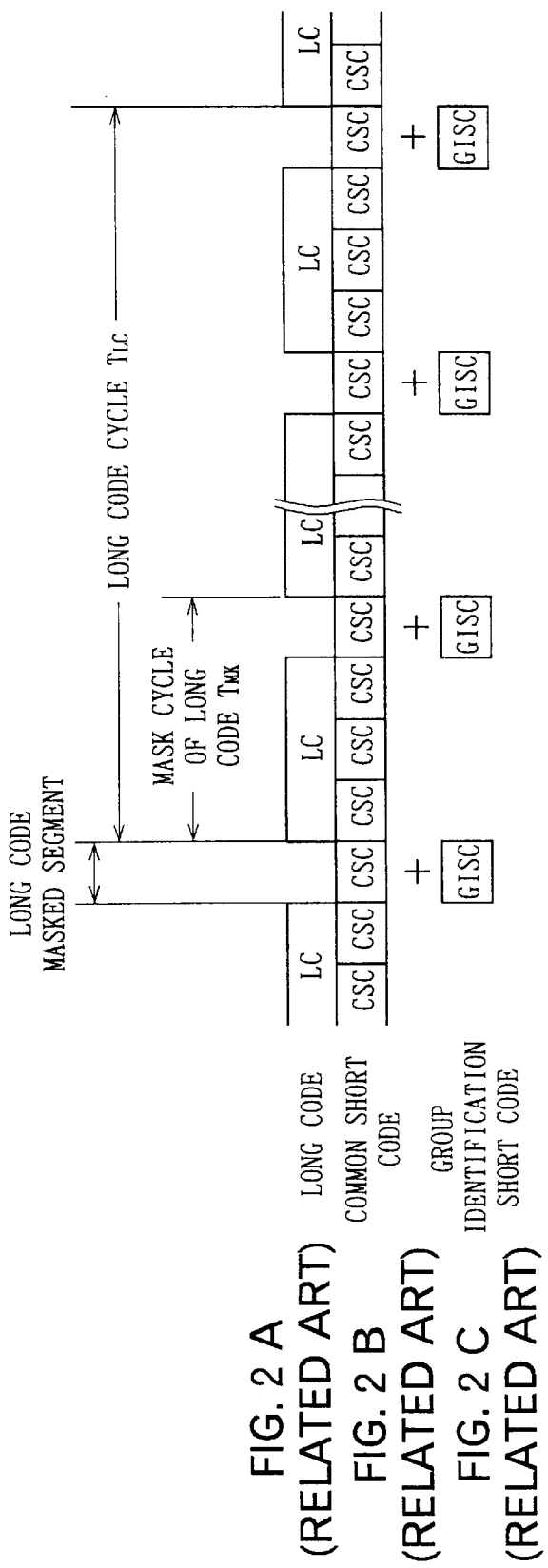
FIGS. 2A to 2C are brief linear diagrams showing the construction of each code in the received signal to be transmitted from the base station.
Figure 3:
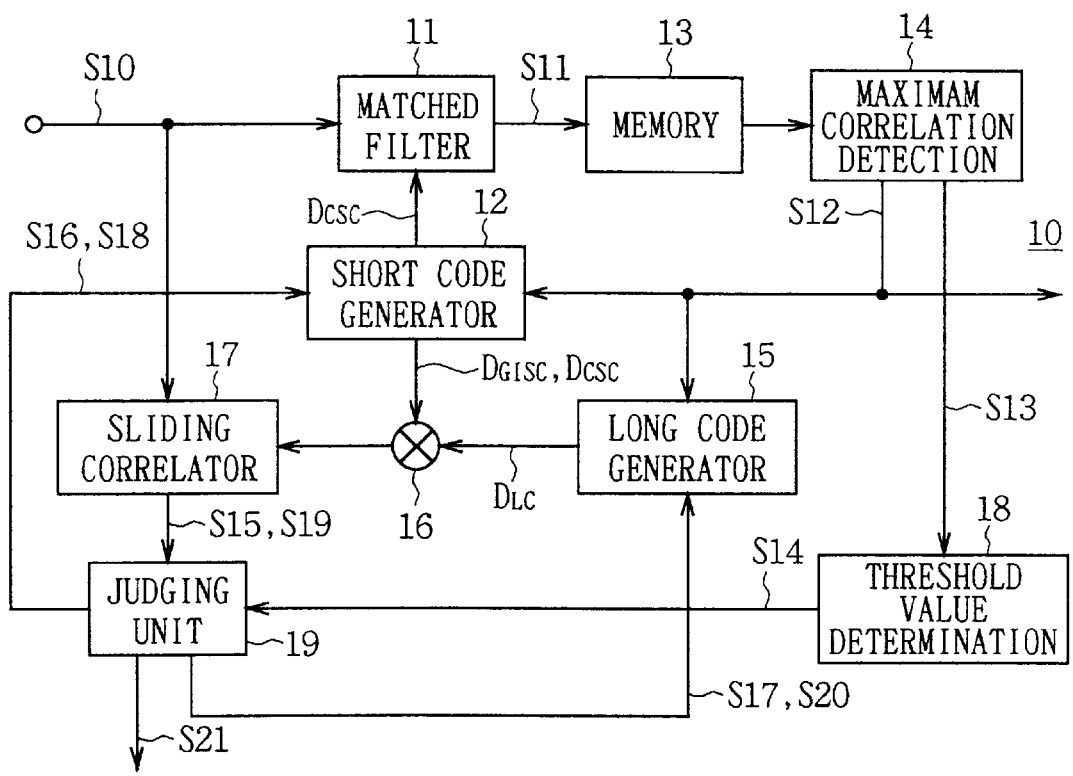
FIG. 3 is a block diagram showing the construction of a conventional synchronization detection device.
Figure 5:
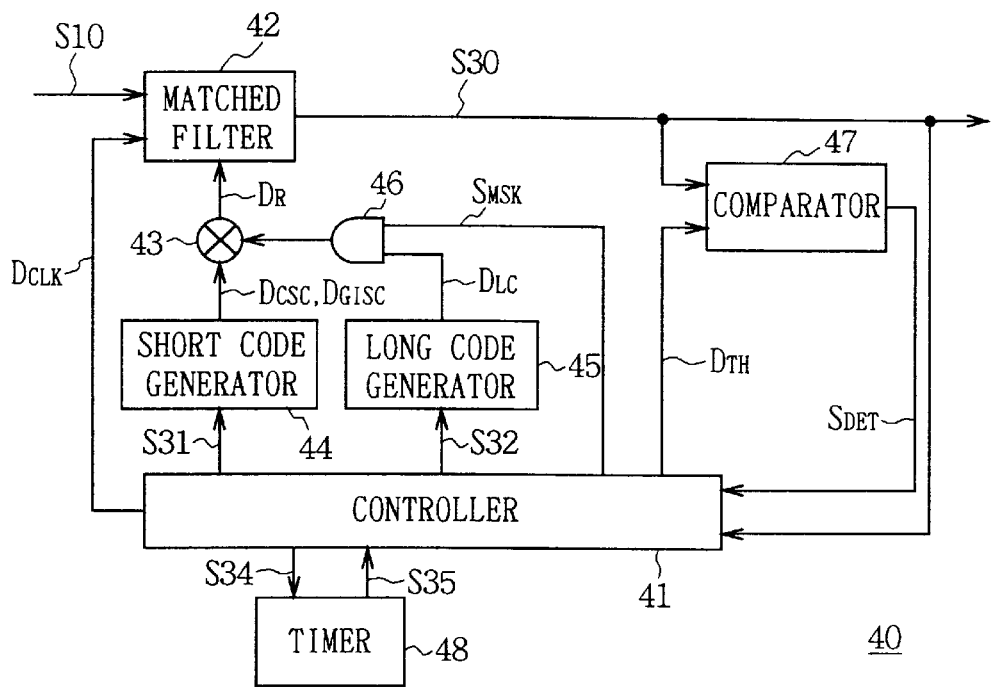
FIG. 5 is a block diagram showing the construction of a synchronization detection device according to the first embodiment.

Preferred embodiments of this invention will be described with reference to the accompanying drawings;

In FIG. 5, 40 generally shows a synchronization detection device according to the first embodiment, and by controlling each circuit block with a controller 41, identifies the long code LC included in the received signal S10 at high speed. In this case, it is supposed that the long code LC, common short code CSC and group identification short code GISC are included in the received signal S10 at the timing shown in FIGS. 2A to 2C.

Figure 6:
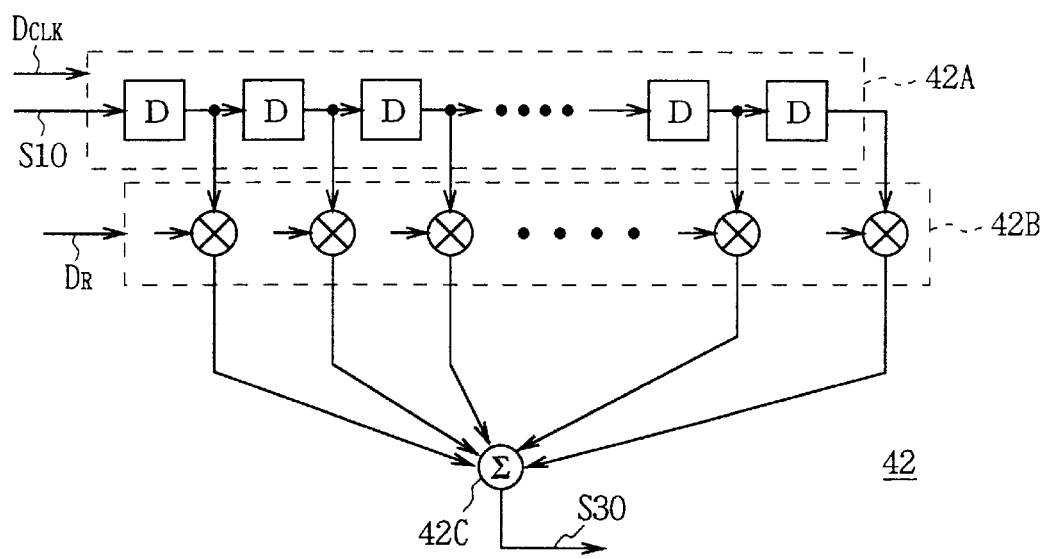
FIG. 6 is a conceptual block diagram showing the internal construction of the matched filter.

First, as shown in FIG. 6, a matched filter 42 comprises the same number of stages of shift registers 42A as the number of chips of common short codes CSC, coefficient multiplier 42B having the same number of multipliers as the number of stages of the shift registers 42A, and a combining circuit 42C for combining the multiplication results to be transmitted from the multipliers of the coefficient multiplier 42B, in which a bit string of received signal S10 is sequentially input to the shift register 42A. Also the shift register 52A receives the operation clock DCLK from the controller 41 and sequentially shifts the bits of the received signal S10 based on this operation clock $D_{CLK}$.

Moreover, the matched filter 42 enters each bit of the replica code $D_R$ to be supplied via the multiplier 43 to each multiplier of the coefficient multiplier 42B one by one, and multiplies each bit to be sent from each register of the shift register 42A by each bit of replica code DR with the coefficient multiplier 42B. Thus, in the matched filter 42, by combining the multiplication result to be transmitted from each multiplier of the coefficient multiplier 42B with the combining circuit 42C, the correlation value S30 is obtained and the resultant correlation value S30 will be transmitted.

The short code generator 44 is a circuit to generate a replica code $D_{CSC}$ of the common short code CSC or a replica code $D_{GISC}$ of the group identification short code GISC, and generates either the replica code $D_{CSC}$ or $D_{GISC}$ based on the control signal S31 to be transmitted from the controller 41. This replica code $D_{CSC}$ or $D_{GISC}$ is entered into the matched filter 42 via the multiplier 43 as a replica code $D_R$ to be correlation-detected.

On the other hand, the long code generator 45 is a circuit to generate a replica code $D_{LC}$ of the long code LC, in which the replica code $D_{LC}$ is generated based on the control signal S32 sent from the controller 41 and is output to the AND circuit 46. A mask control signal $S_{MSK}$ is supplied to the other end of input terminal of the AND circuit 46, and thus, only when the level of the mask control signal $S_{MSK}$ is "H", the replica code $D_{LC}$ is sent out from the AND circuit 46. In the case where the replica code $D_{LC}$ is sent out from the AND circuit 46, the replica code $D_{LC}$ is entered into the multiplier 43 and after being multiplied by the replica code $D_{CSC}$ or $D_{GISC}$, is entered into the matched filter 42 as a replica code $D_R$ to be detected.

The comparator 47, receiving threshold data $D_{TH}$ from the controller 41, compares the value of this threshold data $D_{TH}$ and the value of correlation value S30 transmitted from the matched filter 42. And as a result, if the correlation value S30 exceeds the value of threshold data DTH, the comparator 47 outputs the detection data $S_{DET}$ to the controller 41. The controller 41 outputs a desired threshold value, out of threshold values $V_{TH1}$ to $V_{TH3}$ stored inside and the threshold value $V_{TH4}$ determined by the correlation value S30, to the comparator 47 as threshold data $D_{TH}$.

Figure 7:
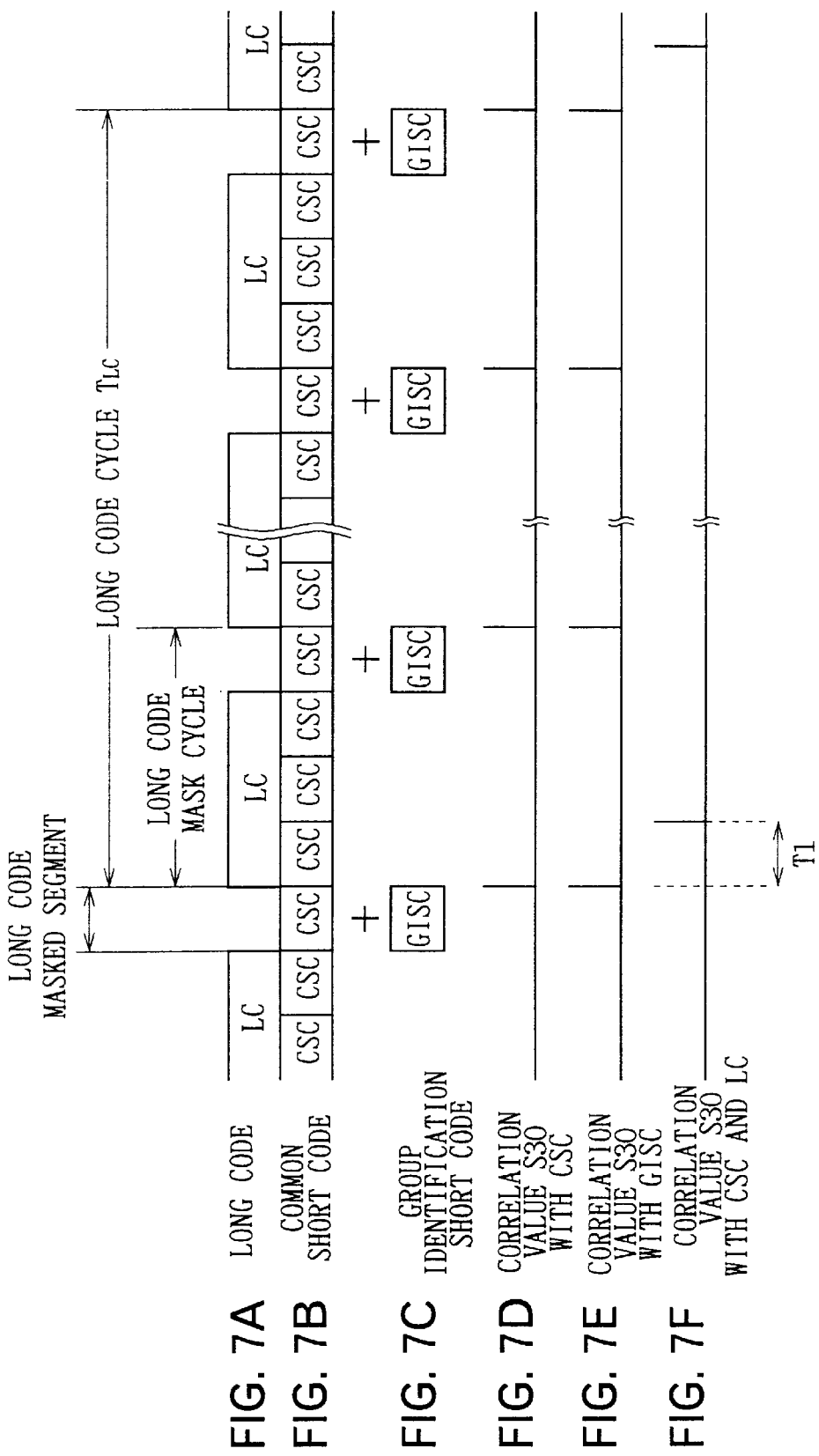
FIGS. 7A to 7F are brief linear diagrams showing the construction of each code in the received signal and the detection timing of correlation values to each code.

As shown in FIG. 7, the timer 48 is a device for counting time to input the received signal S10 only for the length of one cycle T1 of the common short code CSC after identifying the group identification short code GISC, and when the timer 48 receives a count start command S34 from the controller 41, starts the counting operation and counts for the length of one cycle T1. When the timer 48 completes counting for the length of one cycle T1, it outputs count end information S35 to the controller 41. The reason for using the timer 48 to partially input the received signal S10 conducting the counting operation is that the long code LC is identified by the partial correlation and the time to reach the identification is shortened.

Figure 8:
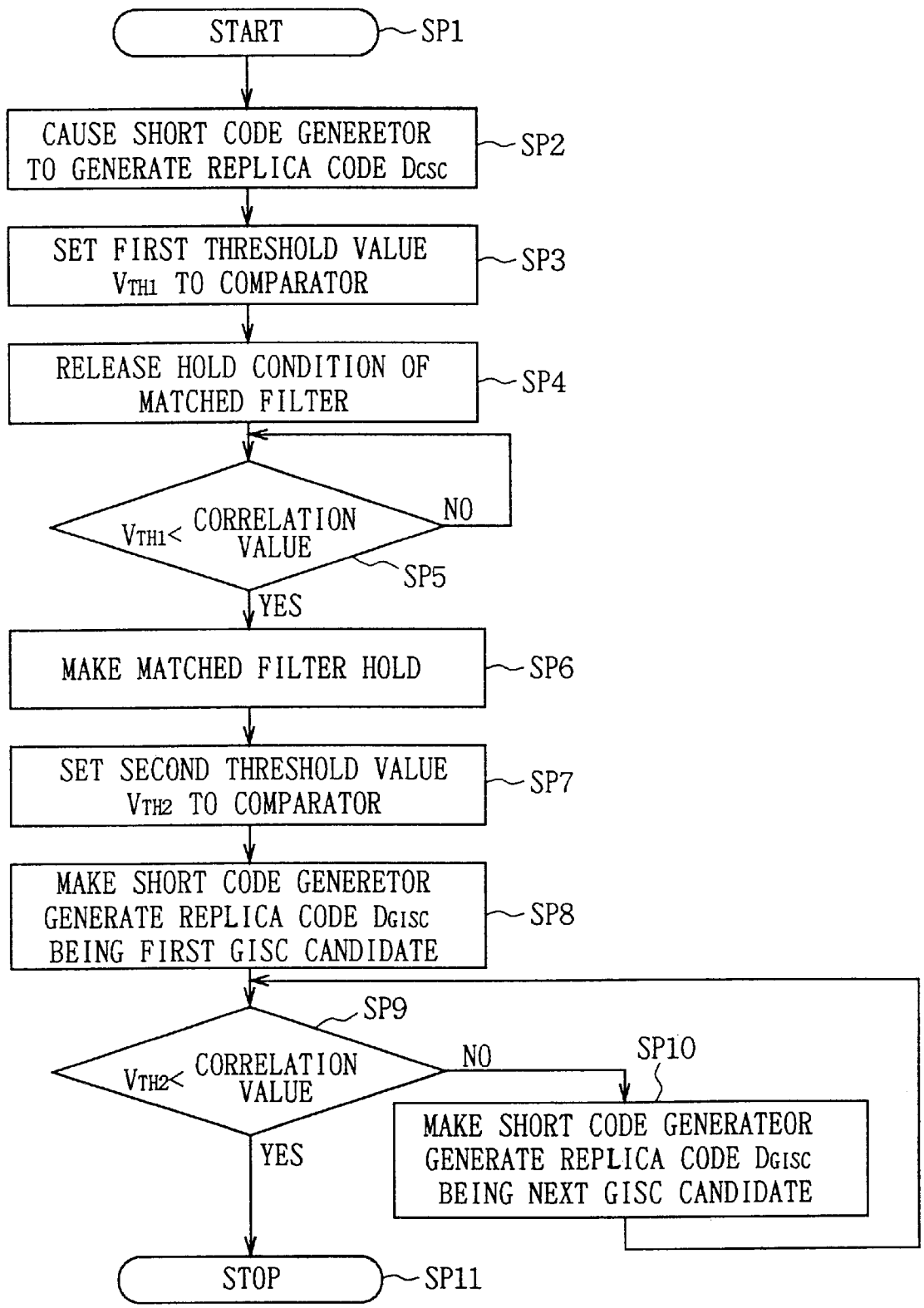
FIG. 8 is a flow chart showing the processing procedure up to the group identification in the first embodiment.
Figure 9:
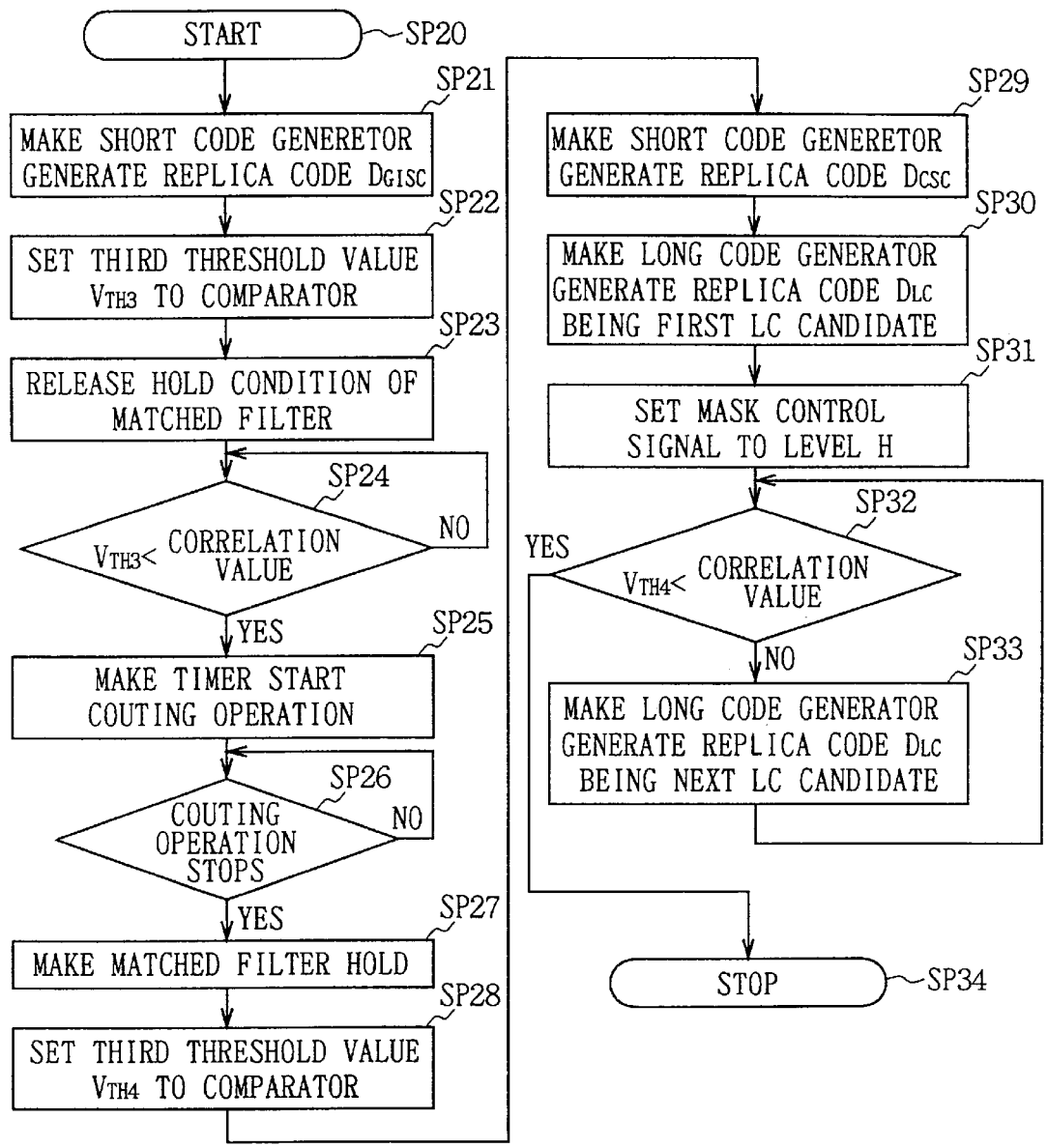
FIG. 9 is a flow chart showing the processing procedure up to the long code identification in the first embodiment.

At this point, in this synchronization detection device 40, the processing procedures for identifying the long code LC included in the received signal S10 will be shown in FIGS. 8 and 9. FIG. 8 shows processing from the timing detection of long code LC by the common short code CSC to the identification of the group identification short code GISC, and FIG. 9 shows processing from the group identification by the group identification short code GISC to the identification of the long code LC.

As shown in FIG. 8, in the case of identifying the group of long code LC, the controller 41 makes the short code generator 44 generate the replica code $D_{CSC}$ of the common short code CSC by outputting the control signal S31 at the step SP2 following the step SP1. Then, at the following step SP3, the controller 41 sets the first threshold value $V_{TH1}$ for detecting the common short code CSC to the comparator 47.

Then, at the following step SP4, the controller 41, by supplying the operation clock $D_{CLK}$ to the matched filter 42, releases the hold state of the matched filter 42 and makes the matched filter 42 start the correlation value calculation operation. At the next step SP5, the controller 41 judges whether the correlation value S30 transmitted from the matched filter 42 exceeds the first threshold value Van or not. More specifically, in this case, the comparator 47 compares the correlation value S30 with the first threshold value $V_{TH1}$, and if the correlation value S30 exceeds the first threshold value $V_{TH1}$, the comparator 47 outputs detection data $S_{DET}$, so that the controller 41 conducts this judgment based on whether this detection data $S_{DET}$ is obtained or not.

As a result of judgment in this step SP5, if the correlation value S30 exceeds the first threshold value $V_{TH1}$, the controller 41 moves to the following step SP6 assuming that the common short code CSC has been detected. At the step SP6, the controller 41 stops bit shift operation of the shift register 42A of the matched filter 42 by stopping the operation clock $D_{CLK}$ to be supplied to the matched filter 42. With this arrangement, the controller 41 holds the received signal S10 of the time when the common short code CSC is detected in the shift register 42A.

At the following step SP7, the controller 41 sets the second threshold value $V_{TH2}$ for detecting the group identification short code GIS to the comparator 47. Then at the next step SP8, the controller 41 causes the short code generator 44 to generate the first candidate of the replica code $D_{GISC}$ out of the plurality of group identification short codes GIS by outputting the control signal S31. Then, the matched filter 42 calculates the correlation value between the received signal S10 presently kept in the shift register 42A and the replica code $D_{GISC}$.

At the next step SP9, the controller 41 judges whether the correlation value S30 sent from the matched filter 42 exceeds the second threshold value $V_{TH2}$ or not in the same manner as the judgment processing at the step SP5. As a result, if the correlation value S30 does not exceed the second threshold value $V_{TH2}$, the controller 41 moves to the step SP10 and causes the short code generator 44 to generates the next candidate of the group identification short code GISC, replica code $D_{GISC}$, and returning to the step SP9 again, conducts the judgment on the correlation value S30. Accordingly, as a result of generating the candidates of group identification short code GISC successively and judging the correlation values S30, if the correlation value S30 exceeds the second threshold value $V_{TH2}$, the controller 41 moves to the step SP11 and terminates the processing assuming that the group identification short code GISC could be identified. As a matter of course, the replica code $D_{GISC}$ which could obtain an affirmative result at the step SP9, becomes group identification short code GISC existing in the received signal S10. Moreover, if the group identification short code GISC can be detected, since the position in which the group identification short code GISC is inserted with respect to the long code LC is already known, this means that the timing of long code LC can be identified. Moreover, since the group identification short code GISC could be identified, this means that the type of long code LC in the received signal S10 could be specified to the group which the group identification short code GISC shows.

In this connection, FIG. 7D and FIG. 7E show the correlation detection timing of short codes. The correlation value S30 of the replica code $D_{CSC}$ becomes large when the common short code CSC existing over the masked segment is captured in the shift register 42A of the matched filter 42, and at that timing the correlation value S30 exceeding the first threshold value $V_{TH1}$ can be obtained. In this case, since the received signal S10 in which common short code CSC is detected is held in the matched filter 42 and replica codes $D_{GISC}$ to be given to the coefficient multiplier circuit 42B of the matched filter 42 are shifted in order of candidate at high speed, the correlation value S30 of replica code $D_{GISC}$ can be detected at almost the same timing as the correlation value S30 with respect to the common short code CSC.

Then, referring to FIG. 9, the processing up to the identification of long code LC will be explained. Provided that in this FIG. 9, the group identification short code GISC could be detected by the processing shown in FIG. 8, and the long code LC will be identified using this group identification short code GISC when intermittently receiving a signal. As shown in this FIG. 9, at the step SP21 following the step SP20, the controller 41, outputting the control signal S31, causes the short code generator 44 to generate replica code $D_{GISC}$ of the group identification short code GIS detected earlier. At the following step SP22, the controller 41 sets the third threshold value $V_{TH3}$ for detecting that group identification short code GISC to the comparator 47.

At the following step SP23, the controller 41 releases the hold state of the matched filter 42 by supplying the operation clock $D_{CLK}$ to the matched filter 42 and makes the matched filter 42 start the correlation value calculation operation. Then, at the next step SP24, the controller 41 judges whether the correlation value S30 transmitted from the matched filter 42 exceeds the third threshold value $V_{TH3}$ or not based on the detection data $D_{DET}$ to be sent from the comparator 47.

As a result of this judgment, when the correlation value 530 exceeds the third threshold value $V_{TH3}$, the controller 41 moves to the following step SP25 supposing that the group identification short code GISC can be detected. At the step SP25, the controller 41 outputs a count start command S34 and causes the timer 48 to count up to time T1. This time T1 represents the time to capture the received signal S10 required for taking partial correlation with respect to the replica code $D_{LC}$ of the long code LC.

At the following step SP26, the controller 41 judges whether the time T1 has elapsed or not based on count stop information S35, and if yes, moves to the next step SP27. At the step SP27, the controller 41 stops the bit shift operation of the shift register 42A of the matched filter 42 by stopping the supply of operation clock $D_{CLK}$ to the matched filter 42 and causes it to hold data currently existing in the shift register 42A.

At the following step SP28 the controller 41 calculates the fourth threshold value $V_{TH4}$ for detecting the long code LC based on the correlation value S30 of the time when the group identification short code GISC was detected and sets this fourth threshold value $V_{TH4}$ to the comparator 47. At the next step SP29, the controller 41, outputting the control signal S31 to the short code generator 44, causes the short code generator 44 to generate the replica code $D_{CSC}$ of the common short code CSC. At the next step SP30, the controller 41 causes the the long code generator 45 to generate the first candidate of the long code LC, the replica code $D_{LC}$, by outputting the control signal S32 to the long code generator 45. Then, at the next step SP31, the controller 41, by switching the mask control signal $S_{MSK}$ to the level "H" outputs the replica code $D_{LC}$ generated at the long code generator 45 to the multiplier 43. Then, the replica code $D_R$, which is obtained by multiplying the replica code $D_{CSC}$ of the common short code CSC by the replica code $D_{LC}$ of the long code LC, is supplied to the matched filter 42. Thus, the matched filter 42 calculates the correlation value between this replica code DR and the received signal S10 currently existing in the shift register 42A.

At the following step SP32, the controller 41 judges whether the correlation value S30 transmitted from the matched filter 42 exceeds the fourth threshold value $V_{TH4}$ or not based on the detection data $S_{DET}$ from the comparator 47. As a result, if the correlation value S30 has not exceeded the fourth threshold value $V_{TH4}$, the controller 41 proceeds to the step SP23 and causes the long code generator 45 to generate the next candidate of the long code LC, replica code $D_{LC}$, and returning to the step SP32, conducts the judgment on the correlation value S30. As a result of sequentially generating candidates of the long code LC and judging the correlation value S30, when the correlation value S30 exceeds the fourth threshold value $V_{TH4}$, the controller 41 moves to the step SP34 and terminates the processing assuming that the long code LC could be identified.

In this case, as a matter of course, the replica code $D_{LC}$ that could obtain an affirmative result at the step SP32 becomes the long code LC existing in the received signal S10. Moreover, in the case of identifying the long code LC just after the processing shown in FIG. 8, the processing up to the step SP24 in FIG. 9 can be omitted.

In this connection, FIGS. 7E and 7F show the relation between the correlation detection timing of the group identification short code GISC and the correlation detection timing of the long code LC. More specifically, after the correlation value S30 of the replica code $D_{GISC}$ is detected, the received signal S10 for the time T1 is captured and the correlation value S30 of this received signal S10 with the replica code $D_{LC}$ of the long code LC is calculated, so that the correlation detection timing of the long code LC becomes the time which is approximately the time T1 elapsed after the correlation of the group identification short code GISC was detected.

According to the foregoing construction, in this first embodiment, the timing of long code LC is detected by detecting the common short code CSC over the masked segment existing in the received signal S10 in utilizing the replica code $D_{CSC}$ of the common short code CSC. Then, holding the received signal S10 of the time when the common short code CSC was detected in the matched filter 42, and by sequentially detecting the correlation between that received signal S10 and the replica code $D_{GISC}$ of the group identification short code GISC, the group identification short code GISC in the received signal S10 is identified. When the group identification short code GISC can be detected, the received signal S10 following the group identification short code GISC is captured and the received signal S10 is held in the matched filter 42, and by sequentially detecting the correlation between the received signal S10 and the replica code $D_{LC}$ of the long code LC, the long code LC in the received signal S10 is identified.

In this case, since during the processing from the detection of the common short code CSC to the identification of the group identification short code GISC, the received signal S10 of the time when the common short code CSC is detected is held in the matched filter 42 and the correlation detection is conducted to the received signal S10 and the group identification short code GISC is identified, the time interval between processing does not occur as compared with the conventional method to capture the received signal at the timing of the common short code CSC and to identify the group identification short code GISC after detecting the common short code CSC thoroughly once, and thus the time necessary for processing until identifying the group identification short code GISC can be shortened. Also, in that case, by holding this received signal S10, the detection processing is conducted on the same received signal S10, so that this would not be directly affected by the condition change of the transmission path, different from the conventional case.

Moreover, during the processing from the identification of the group identification short code GISC to the identification of the long code LC, the received signal S10 for the length of time T1 is captured based on the received signal S10 of the time when the group identification short code GISC was identified, and the long code LC will be identified by detecting the partial correlation by the replica code $D_{LC}$ with respect to this received signal S10, so that the processing until identifying the long code LC can be conducted at high speed as compared with the conventional case.

According to the foregoing construction, since data is held in the matched filter 42 and by switching replica codes DCSC, DGISC and DLC with respect to that data, and the correlation detection is conducted to identify each code, the processing up to the identification of long code LC can be conducted at high speed as compared with the conventional case.

In FIG. 10, 50 generally shows a short code correlation detecting device for obtaining timing of the long code LC by adding correlation values of short codes of the common short code CSC and the group identification short code GISC.

In the matched filter 51 the received signal S10 to be correlation-detected is entered, and the matched filter 51 sequentially captures this received signal S10 into the internal shift register based on the data shift clock $D_{CLK1}$ to be supplied from the outside. Then, the matched filter 51 sequentially calculates the correlation values S40 between this received signal S10 and each of replica codes $D_{CSC}$ and $D_{GISC}$ of the common short code CSC and the group identification short code GISC to be supplied alternatively from the short code generator 52 and outputs these to the latch circuit 54 and the adder 55.

The latch circuit 54 latches the correlation value S40 on the replica code $D_{GISC}$ of group identification short code GISC to be transmitted from the matched filter 51 based on the data latch clock $D_{CLK2}$ supplied from the controller 53, and outputs this to the adder 55 as the correlation value S41. The adder 55 calculates combined correlation value S42 by adding the correlation value S40 on the replica code $D_{CSC}$ of the common short code CSC and the replica code $D_{GISC}$ of the group identification short code GISC and outputs it as the detection correlation value.

The short code generator 52 generates replica code $D_{CSC}$ of the common short code CSC and replica code $D_{GISC}$ of group identification short code GISC alternatively based on the control signal S43 to be supplied from the controller 53 and outputs these to the matched filter 51.

At this point, the correlation detection operation in the short code correlation detecting device 50 will be described in detail referring to timing charts shown in FIGS. 11A to 11F. As shown in FIGS. 11A and 11D, in this short code correlation detecting device 50, the data shift clock $D_{CLK1}$ which rises at approximately middle timing with respect to the timing of each bit of input received signal S10 is supplied, and bits of the received signal S10 are captured into the internal shift register at the rising edge of the data shift clock $D_{CLK1}$.

Moreover, in the short correlation detecting device 50, as shown in FIG. 11C, the data shift clock $D_{CLK1}$ generates replica code $D_{CSC}$ of the common short code CSC over the segment during which the level of the data shift clock $D_{CLK1}$ is "L", and generates replica code $D_{GISC}$ of the group identification short code GISC over the segment during which the level of data shift clock is "H", and thus, replica codes $D_{CSC}$ and $D_{GISC}$ are alternatively generated within one cycle of the data shift clock $D_{CLK1}$.

The matched filter 51, by sequentially calculating the correlation values between each of replica codes $D_{CSC}$ and $D_{GISC}$ to be generated at such timing and the received signal S10 entered into the shift register, generate the correlation values S40 on the replica codes $D_{CSC}$ and $D_{GISC}$ alternatively as shown in FIG. 11D.

As shown in FIG. 11E, the controller 53 generates data latch clock $D_{CLK2}$ of which the level becomes "H" at the timing of generating the correlation value S40 on the replica code $D_{GISC}$. Thus, the latch circuit 54 holds the correlation value S40 on the replica code $D_{GISC}$ by latching the correlation value S40 based on this data latch clock $D_{CLK2}$, and transmits this as the correlation value S41.

Then, as shown in FIG. 11F, in the adder 55, by adding this correlation value S41 to the correlation value S40 at the timing of outputting the correlation value S40 on the replica code $D_{CSC}$, the combined correlation value S42 in which the correlation value on the replica code $D_{GISC}$ and the correlation value on the replica code $D_{CSC}$ are combined can be obtained. And if the timing of long code LC is detected comparing this combined correlation value S42 with the prescribed threshold value as in the case of the first embodiment, the timing of long code LC can be detected considering both the common short code CSC and the group identification short code GISC, and thus, the timing of long code LC can be detected with high precision.

Note that, the correlation value S40 on the replica code $D_{CSC}$ and the correlation value S41 on the replica code $D_{GISC}$ are combined in the adder 55. However, not only the combined correlation value S42 but also the correlation value ratio between replica codes $D_{CSC}$ and $D_{GISC}$ in the combined correlation value S42 can be calculated and this correlation value ratio can be transmitted. With this arrangement, the timing detection considering each correlation value based on the correlation value ratio can be conducted, and thus, the timing of long code LC can be detected with higher precision. Moreover, when the common short code CSC and group identification short code GISC are already known as in the case of intermittent receiving, signals from a desired station can be identified only by the judgment using the correlation value ratio, and thereby the rising time can be accelerated and power can be saved more efficiently.

According to the foregoing construction, by switching the plurality of replica codes $D_{CSC}$ and $D_{GISC}$ during the data shift timing of the matched filter 51, almost simultaneously the correlation values of multiple replica codes are calculated and the combined correlation value S42 is calculated, so that the timing detection can be conducted with higher precision if the timing detection of long code LC using this combined correlation value S42 is be conducted.

In general, since the received signal S10 has been quadrature phase shift keying (QPSK) modulated, the matched filter shown in FIGS. 5 and 10 practically has four-phase construction. Here, the matched filter having four-phase construction will be explained referring to FIG. 12.

Figure 4:
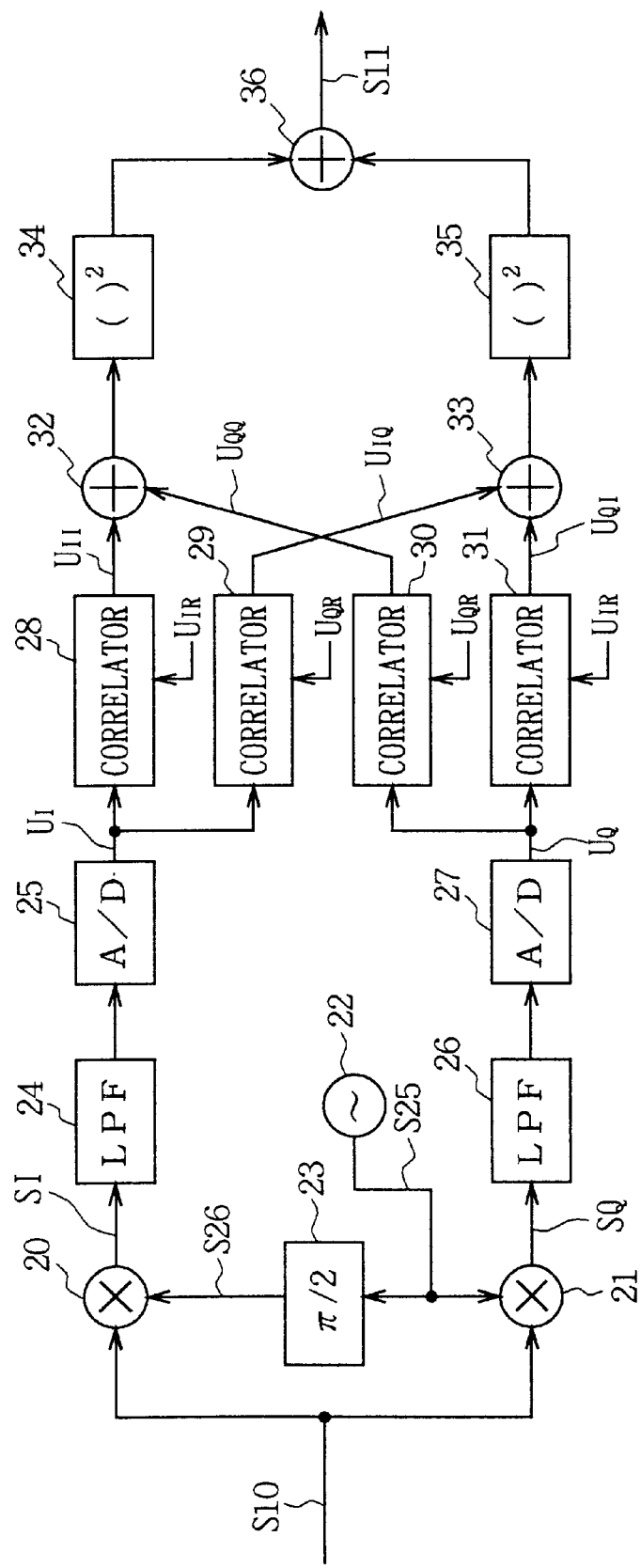
FIG. 4 is a block diagram showing the construction of a conventional 4-phase matched filter.
Figure 12:
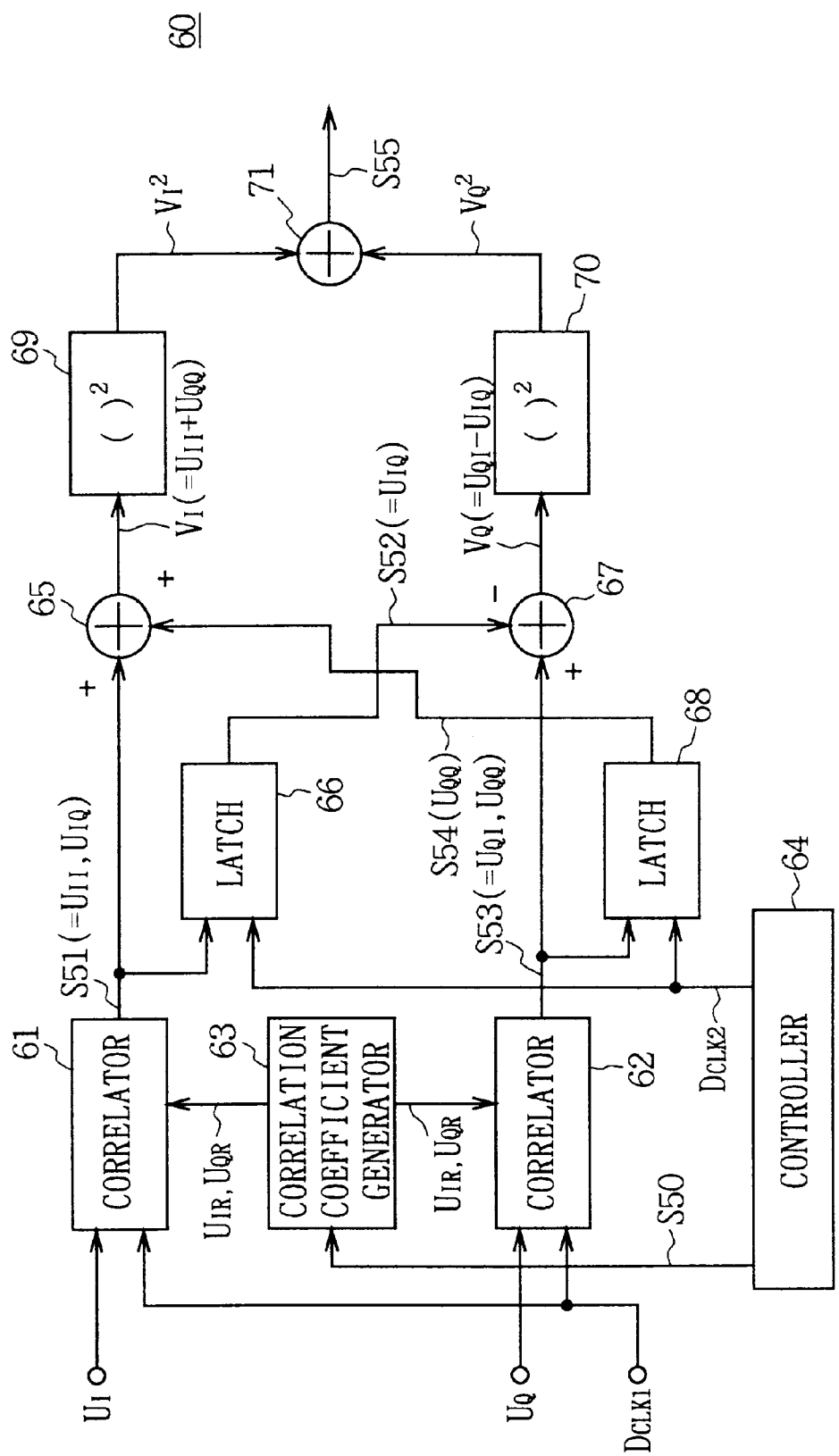
FIG. 12 is a block diagram showing the construction of a four-phase matched filter according to the first embodiment.

In FIG. 12, in which the corresponding parts of FIG. 4 are designated with the same reference numerals, 60 generally shows the matched filter having four-phase construction according to the present invention, and in-phase data $U_I$ and quadrature data $U_Q$ obtained by digital converting in-phase element SI and quadrature element SQ separated from the received signal S10 will be entered into correlators 61 and 62 respectively.

The correlators 61 and 62 are matched filters for detecting the correlation value per each signal element. And data shift clock $D_{CLK1}$ is entered in these correlators 61 and 62, and the correlators 61 and 62 respectively capture the in-phase data $U_I$ and quadrature data $U_Q$ in their internal shift register based on this data shift clock $D_{CLK1}$.

The correlation coefficient generator 63 is a circuit to generate replica code for correlation detection based on the control signal S50, in which in-phase element replica code $U_{IR}$ and quadrature element replica code $U_{QR}$ out of the replica code are generated alternatively and outputted to the correlators 61 and 62 respectively as the correlation coefficient.

The correlator 61 detects the correlation values $U_{II}$ (=$U_I*U_{IR}$) and $U_{IQ}$ (=$U_I*U_{QR}$) between respective replica codes $U_{IR}$, $U_{QR}$ to be supplied alternatively as the correlation coefficient and the in-phase data $U_I$, and outputs these to the adder 65 and latch circuit 66 as the correlation value S51. The latch circuit 66 latch-holds the correlation value $U_{IQ}$ out of the correlation value S51 based on the data latch clock $D_{CLK2}$ to be supplied from the controller 64 and outputs this to the differentiator 67 as the correlation value S52.

On the other hand, the correlator 62 alternatively detects the correlation values $U_{QI}$ (=$U_Q*U_{IR}$) and $U_{QQ}$ (=$U_Q*U_{QR}$) between respective replica codes $U_{IR}$, $U_{QR}$ to be supplied alternatively as the correlation coefficient and the quadrature data $U_Q$, and outputs these as the correlation value S53 to the differentiator 67 and the match circuit 68. The latch circuit 68 latch holds the correlation value $U_{QQ}$ out of correlation value S53 based on the data latch clock $D_{CLK2}$ to be supplied from the controller 64 and transmits this to the adder 65 as the correlation value S54.

The adder 65 adds up the correlation value $U_{II}$ out of correlation value S51 and the correlation value $U_{QQ}$ supplied as the correlation value S54 and transmits the resultant correlation value $V_I$ (=$U_{II}+U_{QQ}$) to the squaring circuit 69. The differentiator 67 calculates the difference between the correlation value $U_{QI}$ out of correlation value S53 and the correlation value $U_{IQ}$ to be supplied as the correlation value S52, and outputs the resultant correlation value $V_Q$ (=$U_{QI}-U_{IQ}$) to the squaring circuit 70.

Thus obtained correlation values $V_I$ and $V_Q$ are squared respectively with the squaring circuits 69 and 70, and by adding the squared results $V_I^2$ and $V_Q^2$ with the adder 71, the correlation value S55 between the received signal S10 and the replica code to be correlation-detected, can be obtained.

At this point, the correlation detection operation in the four-phase constructed matched filter 60 will be described more specifically using timing charts shown in FIGS. 13A to 13I. As shown in FIGS. 13A and 13B, in this matched filter 60, the data shift clock $D_{CLK1}$ is to rise approximately at the middle timing with respect to the timing of each bit of input in-phase data $U_I$ and quadrature data $U_Q$ is to be supplied to correlators 61 and 62. The correlators 61 and 62 respectively capture the in-phase data $U_I$ and the quadrature data $U_Q$ at the rising edge of the data shift clock $D_{CLK1}$ into the internal shift register respectively.

Furthermore, as shown in FIG. 13C, the correlation coefficient generator 63 generates the replica code $U_{IR}$ of in-phase element over the segment in which the level of data shift clock $D_{CLK1}$ is "L" and it generates the replica code $U_{QR}$ of quadrature element over the segment in which the level of data shift clock $D_{CLK1}$ is "H". And thus, replica codes $U_{IR}$ and $U_{QR}$ of in-phase element and quadrature element are alternatively generated every one cycle of the data shift clock $D_{CLK1}$.

The correlator 61, by sequentially calculating correlation values between respective replica codes $U_{IR}$ and $U_{QR}$ to be generated at such timing and the in-phase data $U_I$ captured into the shift register, generates correlation values $U_{II}$ and $U_{IQ}$ on replica codes UIR and $U_{QR}$ alternatively as shown in FIG. 13D. Similarly, the correlator 62, by sequentially calculating correlation values between respective replica codes $U_{IR}$ and $U_{QR}$ to be generated at such timing and the quadrature data $U_Q$ captured into the shift register, generates correlation values $U_{QI}$ and $U_{QQ}$ on replica codes $U_{IR}$ and $U_{QR}$ alternatively as shown in FIG. 13E.

As shown in FIG. 13F, the controller 64 generates data latch clock $D_{CLK2}$ of which level becomes "H" at the timing of generating correlation values $U_{IQ}$ and $U_{QQ}$ on the replica code $U_{QR}$. Thus, the latch circuit 66 holds the correlation value $U_{IQ}$ based on this data latch clock $D_{CLK2}$ and outputs this to the differentiator 67. Similarly, the latch circuit 68 holds the correlation value $U_{QQ}$ based on the data latch clock $D_{CLK2}$ and outputs this to the adder 65.

As shown in FIG. 13G, the adder 65 calculates the correlation value $V_I$ (=$U_{II}$+$U_{QQ}$) by adding the correlation value $U_{QQ}$ to the correlation value $U_{II}$ at the timing of transmitting the correlation value $U_{II}$ from the correlator 61. Similarly, the differentiator 67 calculates the correlation value $V_Q$ (=$U_{QI}$−$U_{IQ}$) by subtracting the correlation value $U_{IQ}$ from the correlation value $U_{QI}$ at the timing of transmitting the correlation value $U_{QI}$ from the correlator 62.

With the above arrangement, after doubling correlation values VI and $V_Q$ at the square-law circuits 69 and 70 respectively, by adding these doubled results $V_{I2}$ and $V_{Q2}$, the correlation value S55 corresponding to the replica code to be correlation-detected can be obtained.

Accordingly, in the case of this matched filter 60, correlation coefficients $U_{IR}$ and $U_{QR}$ are alternatively generated between the data shift timing of in-phase data $U_I$ and quadrature data $U_Q$, and using these correlation coefficients $U_{IR}$ and $U_{QQ}$ the correlation values $U_{II}$, $U_{IQ}$ and $U_{QI}$, $U_{QQ}$ are alternatively generated at the correlators 61 and 62. Therefore, four correlation values $U_{II}$, $U_{IQ}$, $U_{QI}$ and $U_{QQ}$ can be generated without providing four separate correlators as the conventional device, and thereby the circuit configuration of the four-phase matched filter can be simplified as compared with the conventional device.

Next, a synchronization detection device according to second embodiment of this invention will be described.

Figure 14:
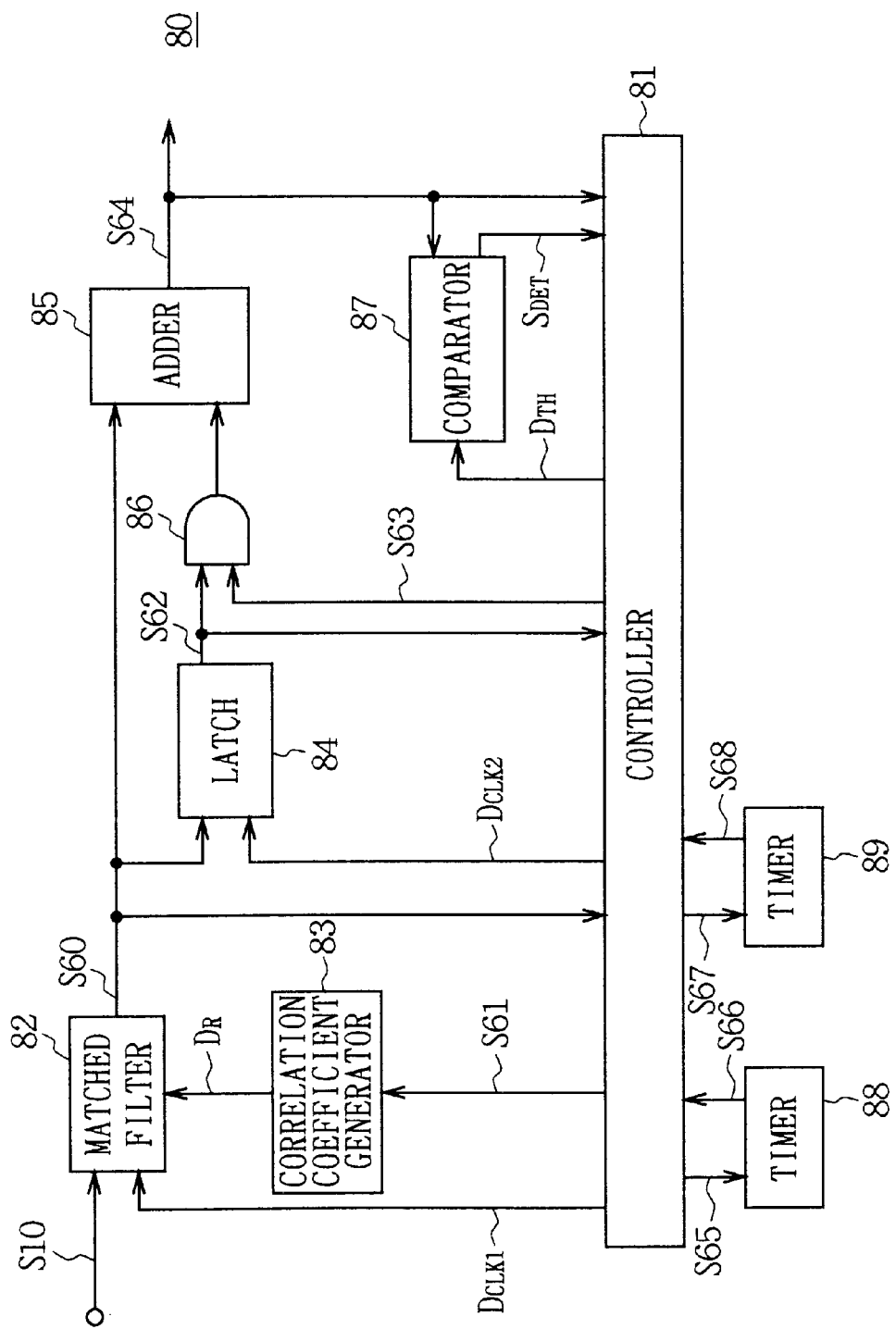
FIG. 14 is a block diagram showing the construction of synchronization detection device according to the second embodiment.

In FIG. 14, 80 generally shows a synchronization detection device according to this embodiment, and long code LC included in the received signal S10 is identified at high speed by controlling each circuit with a controller 81.

Also in the case of this embodiment, the received signal S10 is entered into the matched filter 82, and the matched filter 82 sequentially enters that received signal S10 into the internal shift register based on the data shift clock $D_{CLK1}$ supplied from the controller 81. Then, the matched filter 82 sequentially calculates the correlation value S60 between each bit of the received signal S10 captured and the replica code $D_R$ to be correlation-detected that is generated in the correlation coefficient generator 83, and transmits these to the controller 81, latch circuit 84 and adder 85.

The correlation coefficient generator 83 generates replica code $D_{CSC}$ of the common short code CSC, replica code $D_{GISC}$ of the group identification short code GISC or the replica code in which the replica code $D_{CSC}$ of common short code CSC is multiplied by the replica code $D_{LC}$ of long code LC, based on the control signal S61 from the controller 81, and transmits this to the matched filter 82 as the replica code $D_R$ to be correlation-detected.

The latch circuit 84 latch-holds the desired correlation value out of the correlation values S60 to be transmitted from the matched filter 82 based on the data latch clock $D_{CLK2}$ supplied from the controller 81 and outputs this to the AND circuit 86 and the controller 81 as a correlation value S62. The control signal S63 from the controller 81 is entered into the other input terminal of the AND circuit 86, and when the level of the control signal S63 is "H", the AND circuit 86 outputs the correlation value S62 to the adder 85.

The adder 85 adds up the correlation value S60 to be sent out from the matched filter 82 and the correlation value S62 to be transmitted via the AND circuit 86, and outputs the resultant correlation value S64 to the comparator 87 and the controller 81. Note that, if the correlation value S62 is outputted from the AND circuit 86, the adder 85 outputs the correlation value S60 as it is as the correlation value S64.

The comparator 87 receives threshold data $D_{TH}$ from the controller 81 and compares the threshold value which this threshold data $D_{TH}$ shows with the included correlation value S64, and if the value of the correlation value S64 exceeds the threshold value, the comparator 87 outputs detection data $S_{DET}$ to the controller 81.

The first timer 88, receiving a count start command S65 from the controller 81, counts up to the time of the mask cycle $T_{MK}$ of long code LC shown in FIG. 7, and when the counting is ended, outputs count end information S66 to the controller 81. Moreover, when the second timer 89, receiving the count command S67 from the controller 81, counts up to the time to capture the received signal S10 for detecting the partial correlation (more precisely, the time T1 corresponding to one cycle of the common short code CSC shown in FIG. 7), and when the counting is ended, it outputs count end information S68 to the controller 81.

Figure 15:
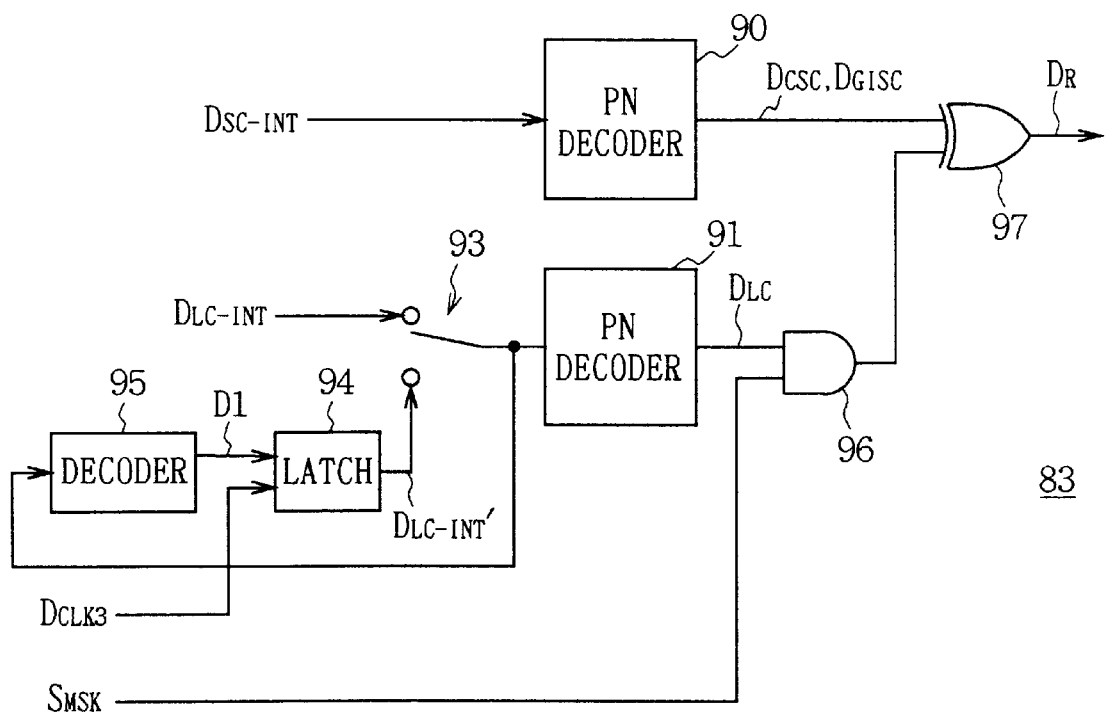
FIG. 15 is a block diagram showing the construction of a correlation coefficient generator according to the second embodiment.

Here, the correlation coefficient generator 83 provided in the synchronization detection device 80 described above will be explained more specifically with reference to FIG. 15. As shown in FIG. 15, the correlation coefficient generator 83 is roughly comprised of two pseudo noise code (PN) decoders 90 and 91, and replica code $D_R$ is generated by operating these two PN decoders 90 and 91 based on the control signal S61 (ie., $D_{SC\text{-}INT}$, $D_{LC\text{-}INT}$, $D_{CLK3}$ and $S_{MSK}$).

The first PN decoder 90 is a decoder to generate replica code $D_{CSC}$ of the common short code CSC or replica code $D_{GISC}$ of the group identification short code GISC, and when it receives the initial value $D_{SC-INT}$ of the common short code CSC or group identification short code GISC, generates data code for one cycle of the corresponding short code CSC or GISC at once and outputs this as the replica code $D_{CSC}$ or $D_{GISC}$.

On the other hand, the second PN decoder 91 is a decoder to generate replica code $D_{LC}$ of the long code LC for detecting the partial correlation, and generates partial long code corresponding to the length for just one cycle of short code out of long code LC, based on the first initial value $D_{LC-INT}$ of the long code LC to be supplied from the controller 81 via the switch 93 or the second initial value $D_{LC-INT}'$ of the long code LC to be supplied from the latch circuit 95 via the switch 93, and outputs this as replica code $D_{LC}$ of the long code LC.

When the data decoder 94 receives the initial value $D_{LC-INT}$ of the long code LC via the switch 93, it forms the initial value D1 for generating the partial long code corresponding to the length for one cycle of the following short code and outputs this to the latch circuit 94. The latch circuit 94 holds this initial value D1 based on the data latch clock $D_{CLK3}$ supplied from the controller 81 and outputs this as the second initial value $D_{LC-INT}$.

Note that, upon receiving the second initial value $D_{LC-INT}$ via the switch 93, the decoder 94 forms and transmits the initial value D1 for generating partial long code corresponding to the length for one cycle of the following short code. And by sequentially repeating this processing, the data decoder 94 forms the initial value D1 to generate the partial long code having a desired phase.

The replica code $D_{LC}$ of the long code LC generated in the second PN decoder 91 is entered into AND circuit 96. At the other input terminal of this AND circuit 96 the mask control signal $S_{MSK}$ to be transmitted from the controller 81 is entered and the AND circuit 96 sends out the replica code $D_{LC}$ only when the level of the mask control signal $S_{MBK}$ is "H".

An exclusive OR circuit 97 conducts the exclusive OR calculation of the replica code $D_{CSC}$ or $D_{GISC}$ transmitted from the first PN decoder 90 and the replica code $D_{LC}$ transmitted via the AND circuit 96, and outputs the resultant code to the matched filter 82 as the replica code $D_R$. Note that, since this is the exclusive OR calculation, if the replica code $D_{LC}$ is not transmitted from the AND circuit 96, the replica code $D_{CSC}$ or $D_{GISC}$ is transmitted as it is.

Figure 16:
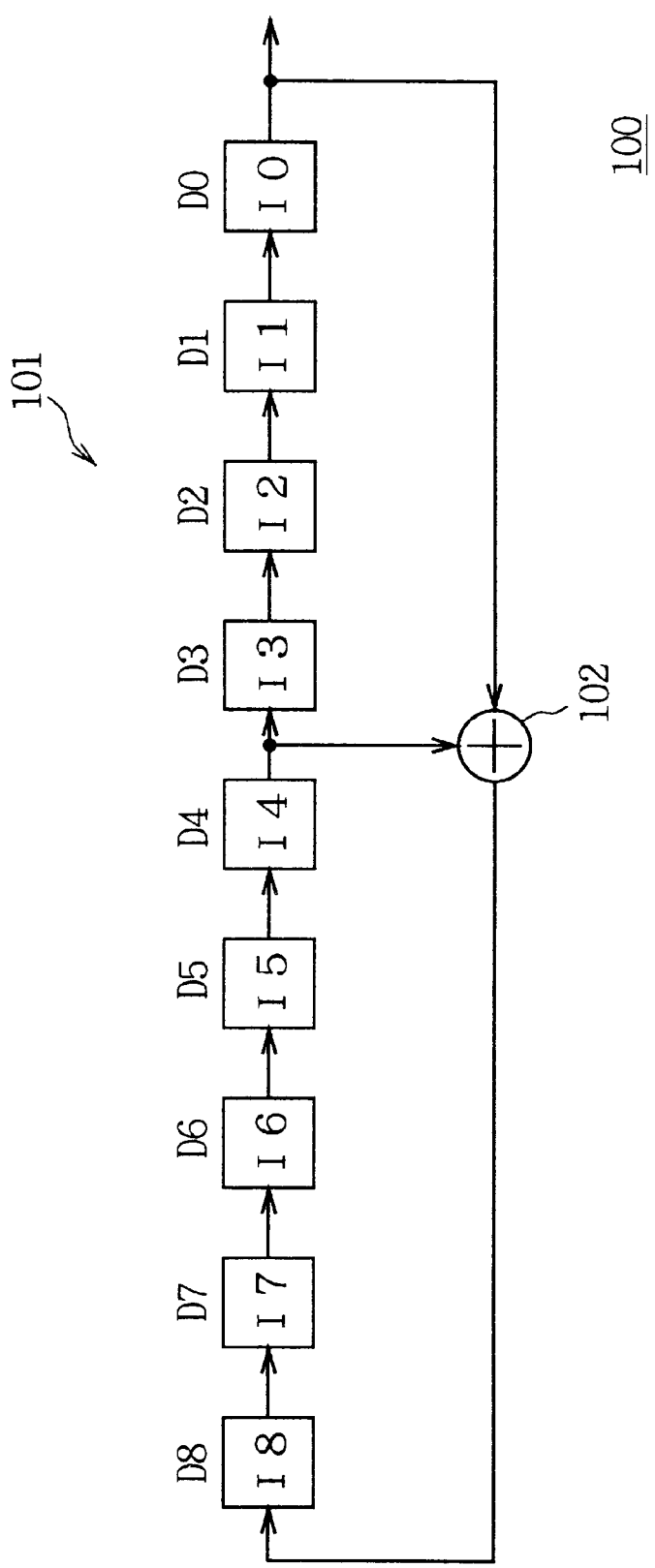
FIG. 16 is a block diagram explaining a general PN decoder.

Here, the principle of replica code generation of PN decoders 90 and 91 described above will be explained. However, in order to simplify the explanation, let the code to be generated at the PN decoder to be PN95. In FIG. 16, 100 is a general PN decoder to generate the PN 95 code, and this comprises a shift register 101 having nine stages and an exclusive OR circuit 102. In this PN decoder 100, output of the register D4 and output of the register D0 are entered into the exclusive OR circuit 102, and by entering the result of the exclusive OR calculation into the register D8, PN code is sequentially transmitted.

Supposing I8 to I0 to be the initial values of D8 to D0, the output O0 at T=0 becomes I0, and when T=1, the value of the shift register 101 shifts to the right by one and the output O1 becomes TI. Moreover, at that time the result of exclusive OR calculation of I4 and I0 is entered into the register D8.

Figure 17:
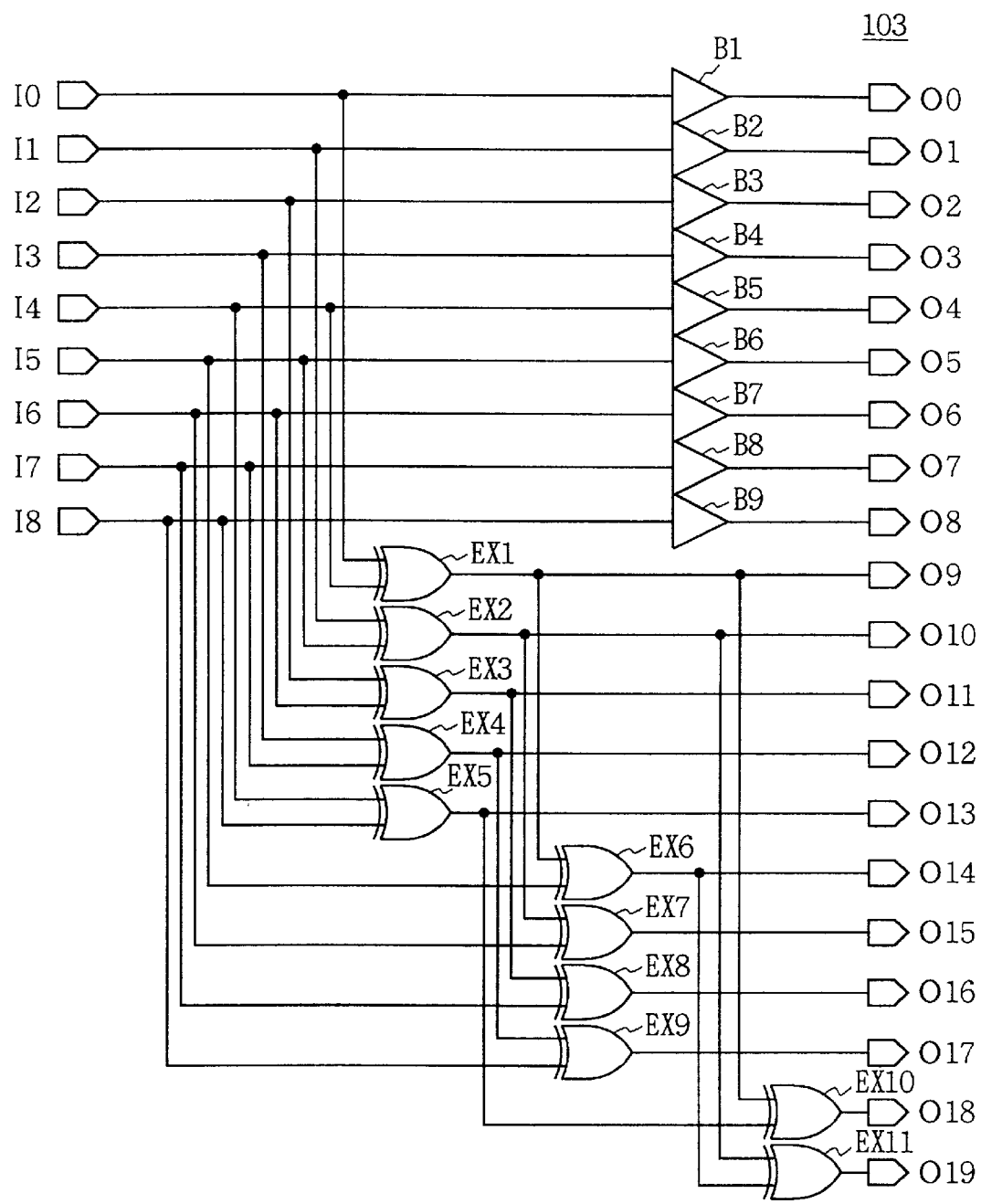
FIG. 17 is a block diagram explaining a PN decoder according to the present invention.

Similarly, when T=2, the output O2 becomes I2, and results of exclusive OR calculation of I1 and I5 are entered into the register D8. Repeating this operation, the output code to be transmitted from the PN decoder 100 become initial values I0 to I8, or the result of exclusive OR operation of the output value of the predetermined time. Taking this into consideration, the output codes O0 to O19 at the time T=0 to 19 can be expressed by the exclusive OR operation based on the initial values I0 to I8. Accordingly, the PN decoder 103 which outputs the output codes O0 to O19 at once at the same time can be constructed by the gate circuit using exclusive OR circuits EX1 to EX11 as shown in FIG. 17. Buffers B1 to B9 provided in the PN decoder 103 are devices to generate delay time for absorbing the operation time in the exclusive OR circuits EX1 to EX11.

The first and the second PN decoders 90 and 91 are formed by the gate circuit using the exclusive OR circuit based on the principle described above. When the initial value $D_{SC-INT}$ is given to the first PN decoder 90, this first PN decoder 90 generates replica code $D_{CSC}$ of the common short code CSC or the replica code $D_{GISC}$ of the group identification short code GISC for one cycle at once, and when the initial value $D_{LC-INT}$ or $D_{LC-INT}$ is given to the second PN decoder 91 at once, this second PN decoder 91 forms replica code $D_{LC}$ of the partial long code corresponding to the length for one cycle of the short code.

Since the PN decoders 90 and 91 to generate replica code $D_{CSC}$, $D_{GISC}$ or $D_{LC}$ of the fixed length are provided in this synchronization detection device 80, the correlation detection can be conducted at high speed giving the correlation coefficients to the matched filter 82 all at once. However, the general PN decoder 100 which generates codes in time series is used and causes the problem that it takes time to generate the replica code of the fixed length and accordingly to detect the correlation.

The replica code $D_{LC}$ is the partial code of the long code LC. In order to detect the correlation with the long code LC, it is desirous to generate the partial code having a desired phase of the long code LC. However, considering the principle of code generation of the PN decoder, output code is determined by the value in the shift register. Thus, if the value in the shift register at the fixed time is calculated and this would be entered into the second PN decoder 91, the partial code of the desired phase can be easily generated without changing the circuit construction. The task of the data decoder 95 described above is to calculate the value in the shift register at the fixed time.

Here, the principle of data calculation in the data decoder 5 will be explained. In general, the value in the shift register at the predetermined time T=X can be obtained by the exclusive OR calculation of the initial value of the shift register and the matrix corresponding to the amount of shift of the shift register. For example, if the code to be generated is taken to be PN 95, the value I8' to I0' in the shift register at T=9 can be expressed as following equation (1):

$$\begin{bmatrix} I0' \\ I1' \\ I2' \\ I3' \\ I4' \\ I5' \\ I6' \\ I7' \\ I8' \end{bmatrix} = \begin{bmatrix} I0 \oplus I4 \\ I1 \oplus I5 \\ I2 \oplus I6 \\ I3 \oplus I7 \\ I4 \oplus I8 \\ I0 \oplus I4 \oplus I5 \\ I1 \oplus I5 \oplus I6 \\ I2 \oplus I6 \oplus I7 \\ I3 \oplus I7 \oplus I8 \end{bmatrix} \quad (1)$$

$$= \begin{bmatrix} 1 & 0 & 0 & 0 & 1 & 0 & 0 & 0 & 0 \\ 0 & 1 & 0 & 0 & 0 & 1 & 0 & 0 & 0 \\ 0 & 0 & 1 & 0 & 0 & 0 & 1 & 0 & 0 \\ 0 & 0 & 0 & 1 & 0 & 0 & 0 & 1 & 0 \\ 0 & 0 & 0 & 0 & 1 & 0 & 0 & 0 & 1 \\ 1 & 0 & 0 & 0 & 1 & 1 & 0 & 0 & 0 \\ 0 & 1 & 0 & 0 & 0 & 1 & 1 & 0 & 0 \\ 0 & 0 & 1 & 0 & 0 & 0 & 1 & 1 & 0 \\ 0 & 0 & 0 & 1 & 0 & 0 & 0 & 1 & 1 \end{bmatrix} \oplus \begin{bmatrix} 10 \\ 11 \\ 12 \\ 13 \\ 14 \\ 15 \\ 16 \\ 17 \\ 18 \end{bmatrix}$$

If this transform matrix is taken as A shown by the following equation (2), this is a matrix for obtaining the value in the shift register when the time "9" has passed from the reference time:

$$A = \begin{bmatrix} 1 & 0 & 0 & 0 & 1 & 0 & 0 & 0 & 0 \\ 0 & 1 & 0 & 0 & 0 & 1 & 0 & 0 & 0 \\ 0 & 0 & 1 & 0 & 0 & 0 & 1 & 0 & 0 \\ 0 & 0 & 0 & 1 & 0 & 0 & 0 & 1 & 0 \\ 0 & 0 & 0 & 0 & 1 & 0 & 0 & 0 & 1 \\ 1 & 0 & 0 & 0 & 1 & 1 & 0 & 0 & 0 \\ 0 & 1 & 0 & 0 & 0 & 1 & 1 & 0 & 0 \\ 0 & 0 & 1 & 0 & 0 & 0 & 1 & 1 & 0 \\ 0 & 0 & 0 & 1 & 0 & 0 & 0 & 1 & 1 \end{bmatrix} \quad (2)$$

Accordingly, in the case of obtaining values I8" to I0" in the register at the time T=18, as shown in the following equation (3), these values can be obtained by the calculation using the transform matrix A making values I8' to I0' in the shift as the initial value at T=9.

$$\begin{bmatrix} 10'' \\ 11'' \\ 12'' \\ 13'' \\ 14'' \\ 15'' \\ 16'' \\ 17'' \\ 18'' \end{bmatrix} = \begin{bmatrix} 10 \oplus 18 \\ 10 \oplus 11 \oplus 14 \\ 11 \oplus 12 \oplus 15 \\ 12 \oplus 13 \oplus 16 \\ 13 \oplus 14 \oplus 17 \\ 14 \oplus 15 \oplus 18 \\ 10 \oplus 14 \oplus 15 \oplus 16 \\ 11 \oplus 15 \oplus 16 \oplus 17 \\ 12 \oplus 16 \oplus 17 \oplus 18 \end{bmatrix} \quad (3)$$

$$= \begin{bmatrix} 1 & 0 & 0 & 0 & 1 & 0 & 0 & 0 & 0 \\ 0 & 1 & 0 & 0 & 0 & 1 & 0 & 0 & 0 \\ 0 & 0 & 1 & 0 & 0 & 0 & 1 & 0 & 0 \\ 0 & 0 & 0 & 1 & 0 & 0 & 0 & 1 & 0 \\ 0 & 0 & 0 & 0 & 1 & 0 & 0 & 0 & 1 \\ 1 & 0 & 0 & 0 & 1 & 1 & 0 & 0 & 0 \\ 0 & 1 & 0 & 0 & 0 & 1 & 1 & 0 & 0 \\ 0 & 0 & 1 & 0 & 0 & 0 & 1 & 1 & 0 \\ 0 & 0 & 0 & 1 & 0 & 0 & 0 & 1 & 1 \end{bmatrix} \oplus \begin{bmatrix} 10 \oplus 14 \\ 11 \oplus 15 \\ 12 \oplus 16 \\ 13 \oplus 17 \\ 14 \oplus 18 \\ 10 \oplus 14 \oplus 15 \\ 11 \oplus 15 \oplus 16 \\ 12 \oplus 16 \oplus 17 \\ 13 \oplus 17 \oplus 18 \end{bmatrix}$$

$$= A \oplus \begin{bmatrix} 10' \\ 11' \\ 12' \\ 13' \\ 14' \\ 15' \\ 16' \\ 17' \\ 18' \end{bmatrix}$$

Figure 18:
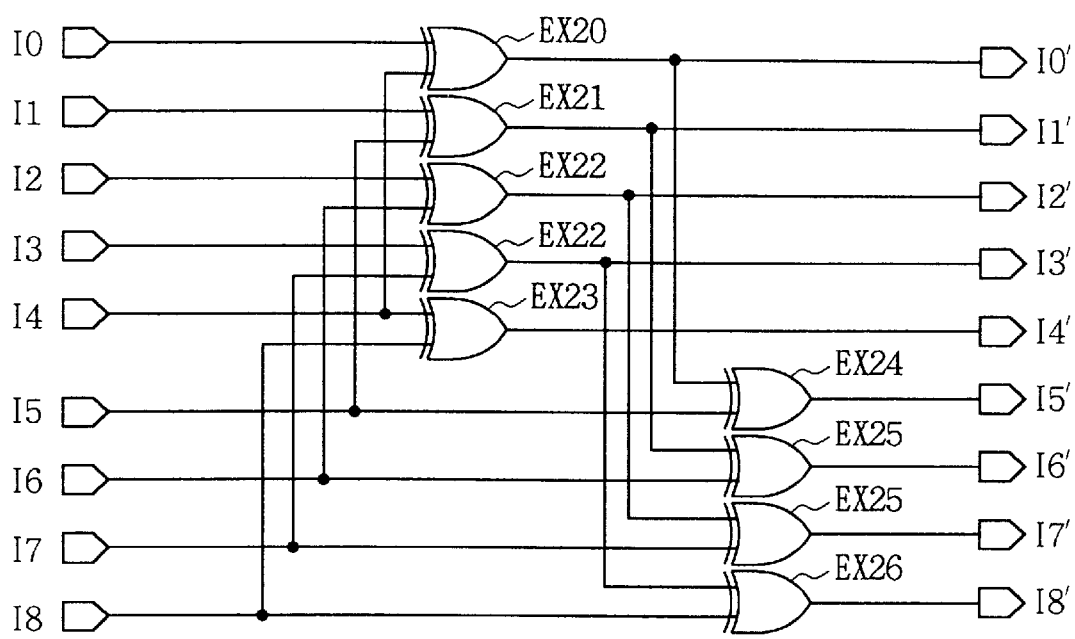
FIG. 18 is a block diagram explaining a data decoder according to the present invention.

Accordingly, as the data decoder it may just conduct the exclusive OR calculation corresponding to this transform matrix. And shown in FIG. 18, the data decoder 105 to obtain the value in the shift register when the time "9" has passed, can be constructed only by the exclusive OR circuits EX20 to EX26.

The data decoder 95 described above is formed only by the exclusive OR circuit based on the above principle, and by conducting the exclusive OR calculation making the initial value $D_{LC-INT}$ or $D_{LC-INT}'$ of the fixed time as an input, it generates the initial value $D_{LC-INT}'$ for generating the partial code of long code LC of the following phase. In this synchronization detection device 80, by providing such data decoder 95, the partial code of the desired phase can be easily generated without changing the circuit construction of the PN decoder 91 by calculating the initial value $D_{LC-INT}'$ having a desired phase by the data decoder 95.

Figure 19:
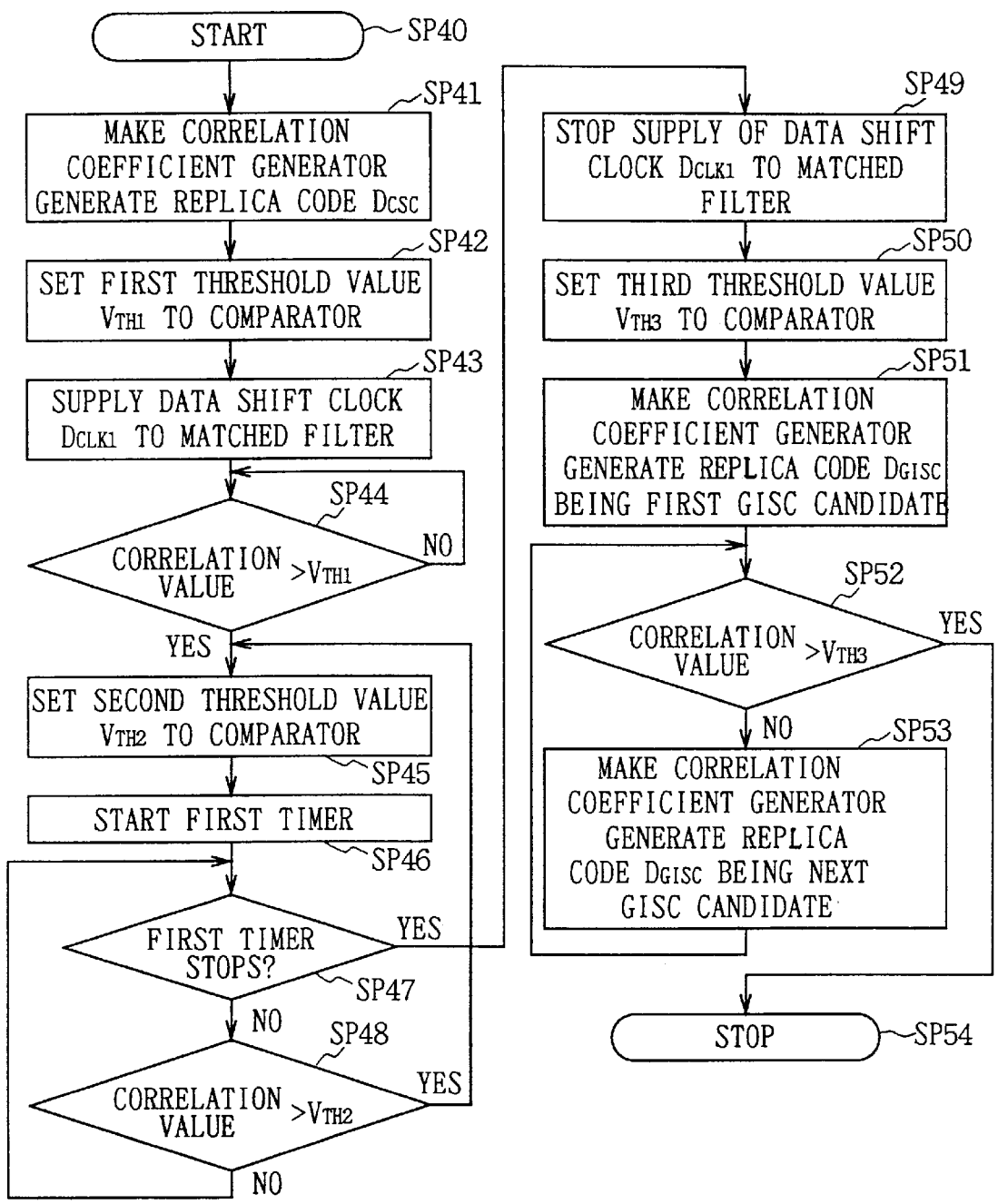
FIG. 19 is a flow chart showing the processing procedure up to the group identification according to the second embodiment.
Figure 20:
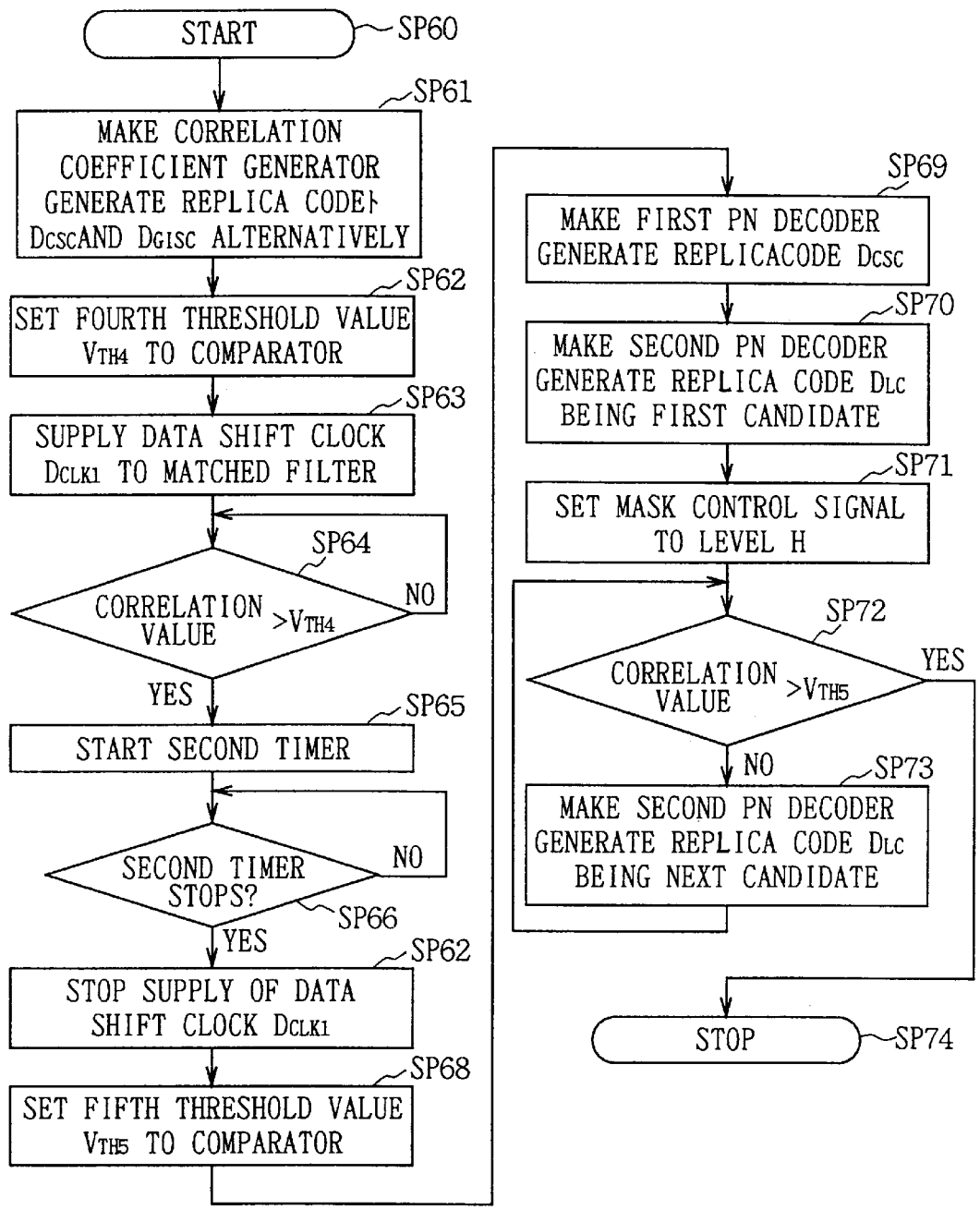
FIG. 20 is a flow chart showing the processing procedure up to the long code identification according to the second embodiment.

The operational procedure in the synchronization detection device 80 will be explained referring to FIGS. 19 and 20. FIG. 19 shows the processing from the timing detection of long code LC by the common short code CSC to the identification of group identification short code GISC, and FIG. 20 shows the processing from the group identification by the group identification short code GISC to the identification of the long code LC.

As shown in FIG. 19, in the case of identifying the group of long code LC, at the step SP41 following the start step SP40, the controller 81, supplying the initial value $D_{SC-INT}$ of the common short code CSC as the control signal S61 to the first PN decoder 90 in the correlation coefficient generator 83, makes the correlation coefficient generator 83 generate replica code $D_{CSC}$ of the common short code CSC.

Then, at the following step SP42, the controller 81, giving the first threshold value $V_{TH1}$ for detecting the common short code CSC to the comparator 87 as the threshold data $D_{TH}$, sets the first threshold value $V_{TH1}$ to the comparator 87. Then, at the next step SP43, supplying data shift clock $D_{CLK1}$ to the matched filter 82, the controller 81 releases the hold state of the matched filter 82 and makes this capture the received signal S10 successively. Thus, the matched filter 82 starts the correlation value calculation between the received signal S10 and the replica code $D_{CSC}$.

At the following step SP44, the controller 81 judge whether the correlation value S60 to be transmitted from the matched filter 82 exceeds the first threshold value $V_{TH1}$ or not. More specifically, the comparator 89 compares the correlation value S64 supplied via the adder 85 with the first threshold value $V_{H1}$, and when the correlation value S64 exceeds the first threshold value $V_{TH1}$, the detection data $S_{DET}$ is sent out. Therefore, the controller 81 conducts this judgment based on whether this detection data $S_{DET}$ is obtained or not.

As a result of this judgment in this step SP44, when the correlation value S60 supplied from the matched filter 82 exceeds the first threshold value $V_{TH1}$, the controller 81 moves to the following step SP4 assuming that the common short code CSC has been detected. At the step SP45, the controller 81 captures the correlation value S60 of the time when it exceeds the first threshold value $V_{TH1}$ and sets the value of this correlation value S60 to the comparator 87 as the second threshold value $V_{TH2}$.

At the following step SP46, the controller 81 makes the first timer 88 count up to the mask cycle $T_{MK}$ of the long code LC by transmitting a count start command S65 to the first timer 88. At the next step SP47, the controller 81, judging whether the count stop information S66 has been obtained or not from the first timer 88, judges whether the mask cycle $T_{MK}$ has passed or not. As a result, if the mask cycle has not passed, the controller 81 moves to the step SP48, and if the mask cycle time has passed, it proceeds to the step SP49.

At the step SP48, the controller 81 judges whether the correlation value S60 supplied from the matched filter 82 exceeds the second threshold value $V_{TH2}$ or not. As a result, if the correlation value S60 exceeds the second threshold value $V_{TH2}$, the controller 81 returns to the step SP45 and resets the then correlation value S60 as the second threshold value $V_{TH2}$ and repeats the same processing. On the other hand, if the correlation value S60 has not exceeded the second threshold value $V_{TH2}$, the controller 81 returns to the step SP47 and repeats this processing until the timer stops. More specifically, in the processing from the step SP45 to the step SP48, it is detected whether the correlation value detected first is the largest correlation value or not in the mask cycle $T_{MK}$, and if this is the largest correlation value, it proceeds to the step SP49, and if another large correlation value exists, it is detected whether it is the largest correlation value in the mask cycle $T_{MK}$ or not.

With the above arrangement, when the largest correlation value in the mask cycle $T_{MK}$ is detected, the controller 81 moves to the step SP49 assuming that the common short code CSC can be detected. At the step SP49, the controller 81, stopping the supply of data shift clock $D_{CLK1}$ to the matched filter 82, stops the bit shift operation of the shift register in the matched filter 82. And thus, it holds the received signal S10 of the time when the common short code CSC is detected in the shift register.

At the following step SP50, the controller 81, multiplying the second threshold value $V_{TH2}$ set finally to the comparator 87 by the predetermined numbers, newly sets to the comparator 87 the third threshold value $V_{TH3}$ for detecting group identification short code GISC. At the following step SP51, the controller 81, supplying the initial value $D_{SC-INT}$ for generating replica code $D_{GISC}$ of the first candidate group identification short code GISC to the first PN decoder 90 of the correlation coefficient generator 83, causes the correlation coefficient generator 83 to generate the replica code $D_{GISC}$ of the first candidate group identification short code GISC. Thus, the matched filter 82 starts the calculation of correlation values between the received signal S10 being held in the shift register and the replica code $D_{GISC}$.

At the following step SP52, the controller 81 judges whether the correlation value S60 output from the matched filter 82 exceeds the third threshold value $V_{TH3}$ or not, based on the detection data $S_{DET}$ from the comparator 87. As a result, if the correlation value S60 has not exceeded the third threshold value $V_{TH3}$, the controller 81 proceeds to the step SP53 and causes the correlation coefficient generator 83 to generate the next candidate replica code $D_{GISC}$ of the group identification short code GISC and returning to the step SP52 again, it conducts the judgment on the correlation value S60.

Accordingly, as a result of successively generating the candidates of the group identification short code GISC and determining the correlation value S60, if the correlation value S60 exceeds the third threshold value $V_{TH3}$, the controller 81 moves to the step SP54 and terminates the processing assuming that the group identification short code GISC can be identified. In this case, as a matter of course, the replica code $D_{GISC}$ which obtains the affirmative result at the step SP52 becomes the group identification short code GISC existing in the received signal S10. Also, if the group identification short code GISC could be identified, the position at which the group identification short code GISC is inserted in the long code LC is known, and this means that the timing of long code LC can be detected. Moreover, because the group identification short code GISC could be identified, this means that the group of long code LC existing in the received signal S10 can be specified to the group shown by the group identification short code GISC.

Here, an example of the timing chart up to the group identification when the processing of FIG. 19 is conducted will be shown in FIGS. 21A to 21C. First, at the time t1, as well as generating the replica code $D_{CSC}$ of the common short code CSC, data shift clock $D_{CLK1}$ is supplied to the matched filter 82, the matched filter 82 sequentially captures received signal S10 and calculates the correlation value S60 with the replica code $D_{CSC}$. As a result, at time t2, if the correlation value S60 from the matched filter 82 exceeds the first threshold value $V_{TH1}$, it sets the correlation value S60 of that time as the second threshold value $V_{TH2}$, and simultaneously starts the first timer 88 and compares the correlation value S60 supplied again from the matched filter 82 with the second threshold value $V_{TH2}$.

As a result, as shown in FIGS. 21A to 21C, if the correlation value S60 exceeds the second threshold value $V_{TH2}$ at the time t3 before the first timer 88 stops, the then correlation value S60 is set again as the second threshold value $V_{TH2}$, and the first timer 88 starts. As a result, if there is no correlation value S60 that exceeds the second threshold value $V_{TH2}$ before the first timer 88 stops, the supply of the data shift clock $D_{CLK}$ is stopped at the time point t4 to cause the matched filter 82 to hold the received signal S10 therein and moreover, the value of the correlation value S60 detected at the time point t3 which is multiplied by the predetermined numbers is reset as the third threshold value $V_{TH3}$. Furthermore, the replica code $D_{GISC}$, which is the first candidate of the group identification short code GISC, is generated from the correlation coefficient generator 83.

Under such conditions the value of the correlation value S60 transmitted from the matched filter 82 is compared with the third threshold value $V_{TH3}$, and if the correlation value S60 does not exceed the third threshold value $V_{TH3}$, the next candidate replica code $D_{GISC}$ is to generated and also the correlation value S60 is be determined. As a result, at the time point t5 if the correlation value S60 exceeds the third threshold value $V_{TH3}$, the then replica code $D_{GISC}$ is determined as the group identification short code GISC in the received signal S10 and the processing is terminated. Thus, in this synchronization detection device 80, the group identification short code GISC is identified according to the processing described above.

Next, the processing up to the long code LC identification will be explained referring to FIG. 20. In FIG. 20, assuming that the group identification short code GISC could be detected in the past according to the processing shown in FIG. 19, the long code LC is identified using that group identification short code GISC at the time of intermittent reception. As shown in this FIG. 20, at the step SP61 following the start step SP60, the controller 81, by giving the initial value $D_{SC\text{-}INT}$ to generate the replica code $D_{CSC}$ of the common short code CSC and the initial value $D_{SC\text{-}INT}$ to alternatively generate the replica code $D_{GISC}$ of the group identification short code GISC to the first PN decoder 90 of the correlation coefficient generator 83, causes the correlation coefficient generator 83 to generate the replica code $D_{CSC}$ and the replica code $D_{GISC}$ alternatively.

Then at the following step SP62, the controller 81 sets the fourth threshold value $V_{TH4}$ for detecting both common short code CSC and group identification short code GISC to the comparator 87. At the following step SP63, the controller 81, giving the data shift clock $D_{CLK1}$ to the matched filter 82, releases the hold state of the matched filter 82 and makes the matched filter 82 start the correlation calculation operation. Thus, the matched filter 82, receiving the replica codes $D_{CSC}$ and $D_{GISC}$ to be supplied alternatively within one cycle of the data shift clock $D_{CLK1}$, calculates the correlation value between respective replica codes $D_{CSC}$, $D_{GISC}$ and the received signal S10 and, outputs this as the correlation value S60. At this point, the controller 81, as well as giving the data latch clock $D_{CLK2}$ to the latch circuit 84, gives the control signal S63 having the level "H" to the AND circuit 86, and causes the latch circuit 84 to latch the correlation value S60 of the replica code $D_{GISC}$ and supplies that value to the adder 85. Thus, the adder 85 obtains the correlation value S64 in which the correlation value of the replica code $D_{CSC}$ and the correlation value of the replica code $D_{GISC}$ are added.

At the following step SP64, the controller 81 judges whether the correlation value S64 transmitted from the adder 85 exceeds the fourth threshold value $V_{TH4}$ or not.

As a result of this judgment, if the correlation value S64 exceeds the fourth threshold value $V_{TH4}$, the controller 81 moves to the following step SP65 assuming that the common short code CSC and the group identification short code GISC could be detected. At the step SP65, the controller 81, sending the count start command S67 to the second timer 89, causes the second timer 89 to count up to the time T1 to capture the received signal S10 to detect the partial correlation.

At the following step SP66, the controller 81 judges whether the time T1 has passed or not, based on the count stop information S68 from the timer 89. And if it is found that the time has passed, the controller 81 proceeds to the step SP67. At the step SP67, the controller 81, stopping the data shift clock $D_{CLK1}$ to supply to the matched filter 82, stops the bit shift operation of the shift register in the matched filter 82, and makes this hold the received signal S10 currently existing in the shift register.

At the following step SP68, the controller 81 sets the fifth threshold value $V_{TH5}$ for detecting long code LC to the comparator 87. At the next step SP69, by supplying the initial value $D_{SC\text{-}INT}$ for generating replica code $D_{CSC}$ of the common short code CSC to the first PN decoder 90 of the correlation coefficient generator 83, the controller 81 causes the first PN decoder 90 to generate the replica code $D_{CSC}$. At the next step SP70, by supplying the initial value $D_{LC\text{-}INT}$ for generating partial code of the first candidate long code LC to the second PN decoder 91 of the correlation coefficient generator 83, the controller 81 makes the second PN decoder 91 generate the first candidate replica code $D_{LC}$. At the following step SP71, the controller 81, setting the mask control signal $S_{MSK}$ to the level "H", causes the correlation coefficient generator 83 to generate replica code $D_R$ in which the replica code $DC_{CSC}$ is multiplied by the replica code $D_{LC}$. Then, the matched filter 82 calculates the correlation value S60 between the held received signals S10 and the replica code $D_R$ formed of replica codes $D_{CSC}$ and $D_{LC}$.

Then, at the following step SP72, the controller 81 judges whether the correlation value S60 transmitted from the matched filter 82 exceeds the fifth threshold value $V_{TH5}$ or not, based on the detection data $S_{DET}$ transmitted from the comparator 87. As a result, if it is found that the correlation value S60 has not exceeded the fifth threshold value $V_{TH5}$, the controller 81 proceeds to the step SP73. At this step SP73, the controller 81, by supplying the initial value $D_{LC\text{-}INT}$ for generating the next candidate replica code DLC into the second PN decoder 91, makes the second PN decoder 91 generate the next candidate replica code $D_{LC}$ and upon returning to the step SP72, conducts the judgment on the correlation value S60. To be more precise, before moving to the next candidate, replica codes $D_{LC}$ with shifted phase are sequentially generated on that candidate and the correlation is detected. As a result, if there is no correlation value exceeding the threshold value in that candidate, the controller 81 moves to the next candidate. With this arrangement, in this synchronization detection device 80, the phase of long code LC is identified with the identification of long code LC.

Thus, as a result of judgement of correlation value S60 by sequentially generating candidates of the long code LC, if the correlation value S60 exceeds the fifth threshold value $V_{TH5}$, the controller 81 moves to the step SP74 assuming that the long code LC has been identified, and terminates the processing.

In this case, as a matter of course, the replica code $D_{LC}$ which obtains an affirmative result in the step SP72 becomes the long code LC existing in the received signal S10. Moreover, in the case of identifying the long code LC continuing immediately after the processing shown in FIG. 19 has been conducted, the processing up to the step SP64 in the process shown in FIG. 20 can be omitted.

According to the foregoing construction, at first, this synchronization detection device 80 generates replica code $D_{CSC}$ of the common short code CSC for detecting common short code CSC to regulate timing of long code LC, and calculates the correlation value S60 between the received signal S10 and the replica code $D_{CSC}$ by sequentially capturing the received signal S10 with the matched filter 82. Then, this synchronization detection device 80, judging whether the correlation value S60 exceeds the first threshold value $V_{TH1}$ or not, detects the common short code CSC.

When the common short code CSC can be detected, this synchronization detection device 80 generates the replica code $D_{GISC}$ of the group identification short code GISC and causes the matched filter 82 to hold the received signal S10 of the time when the common short code CSC is detected and to calculate the correlation value S60 between that received signal S10 and the replica code $D_{GISC}$. Then, successively changing replica code $D_{GISC}$ of the group identification short code GISC, the synchronization detection device 80 identifies group identification short code GISC by judging whether that correlation value S60 has exceeded the second threshold value $V_{TH2}$ or not.

After detecting the group identification short code GISC, the received signal S10 for calculating partial correlation of the long code LC is captured into the matched filter 82, and when this processing ends, the matched filter 82 is set to be in a hold state, partial replica code $D_{LC}$ of the long code LC is generated, and the correlation value S60 between the received signal S10 and the replica code $D_{LC}$ is calculated with the matched filter 82. And replica codes $D_{LC}$ of the long code LC are sequentially changed in the group specified by the group identification short code GISC, and by judging whether the correlation value S60 exceeds the fifth threshold value $V_{TH1}$ or not, long code LC can be identified.

Thus, in this synchronization detection device 80, by successively changing the replica codes DR ($D_{CSC}$, $D_{GISC}$ and $D_{LC}$) while holding the received signal S10 in the matched filter 82, the correlation value with respect to each replica code can be obtained at high speed and each code can be identified at high speed. And thus, the long code LC included in the received signal S10 can be identified at higher speed as compared with the conventional device.

According to the foregoing construction, the received signal S10 can be held in the matched filter 82 and by changing the replica codes $D_{CSC}$, $D_{GISC}$ and $D_{LC}$ at fixed timing, the correlation value S60 can be calculated and each code is to be identified, so that the long code LC included in the received signal S10 can be identified at high speed.

Note that, in the aforementioned embodiment, the present invention is applied to the cellular radio communication system of asynchronous communication between base stations in DS-CDMA scheme. However, the present invention is not limited thereto and the same effect as aforementioned case can be obtained if the present invention is applied to other systems.

According to the present invention as described above, a data shift clock to be given to matched filtering means stops at desired timing to hold a received signal, and by changing a replica code generated by the correlation coefficient generating means to a first, second, or third replica code at desired timing and calculating the correlation value of that time, the second code, the third code and the first code are successively detected and the timing and the code group of the first code are detected. Thereby, the matched filtering means can conduct the correlation detection holding the received signal and thus, each correlation detection can be conducted at almost the same timing and the first code included in the received signal can be identified at high speed as compared with the conventional device.

While the preferred embodiments of the invention have been described, it will be obvious to those skilled in the art that various changes and modifications may be made, therefore, to cover in the appended claims all such changes and modifications as fall within the true spirit and scope of the invention.

What is claimed is:

1. A synchronization detection device for receiving a signal including a first code, a second code for detecting a timing of said first code and a third code for specifying a group of said first code and for detecting said timing and a code type of said first code included in a received signal, said synchronization detecting device comprising:

a correlation detecting device for sequentially capturing said received signal based on a data shift clock supplied to said correlation detecting device, for receiving a replica code corresponding to one of said first, said second and said third code and for detecting a correlation value between one of a first replica code, a second replica code and a third replica code and said received signal;

a correlation coefficient generating device for generating one of said first, said second and said third replica codes and supplying a generated replica code to said correlation detecting device; and a control device for stopping a supply of said data shift clock to said correlation detecting device at a desired timing and causing said correlation detecting device to hold said received signal, and for simultaneously switching a replica code to be generated by said correlation coefficient generating device to one of said first, said second and said third replica codes at said desired timing and detecting said correlation value of said desired timing, and thereby, detecting, respectively, said second code, said third code and said first code in order to detect said timing and said code type of said first code.

2. The synchronization detection device according to claim 1, further comprising:

a comparator for detecting whether said correlation value exceeds a prescribed threshold value; and wherein said control device detects said correlation value by setting said threshold value of said comparator in accordance with switching of replica codes.

3. The synchronization detection device according to claim 2, wherein:

said control device causes said correlation coefficient generating device to generate said second replica code, causes said data shift clock to be supplied to said correlation detecting device in order to cause said correlation detecting device to detect said correlation value on said second replica code, and, by judging whether said correlation value exceeds a first threshold value, detects said second code so as to detect said timing of said first code;

said control device stops, when said second code is detected, said supply of said data shift clock, thereby causing said correlation detecting device to hold said received signal and causes said correlation coefficient generating device to generate successively third replica codes as third code candidates, and, by judging whether said correlation value sent from said correlation detecting device exceeds a second threshold value, said control device detects said code type of said third code; and said control device causes, when said third code is detected, said data shift clock to be supplied to said correlation detecting device for a fixed period of time thereby causing said correlation detecting device to capture and hold a fixed length of said received signal and causes said correlation coefficient generating device to successively generate first replica codes of said group specified by said third code, and, by judging whether said correlation value to be transmitted from said correlation detecting device exceeds a third threshold value, said control device detects said code type of said first code.

4. The synchronization detection device according to claim 3, wherein said first replica code is a partial code corresponding to said first code, and when detecting said code type of said first code, a partial correlation to said first code is detected by said correlation detecting device.

5. The synchronization detection device according to claim 2, wherein:

said comparator compares a synchronization correlation value generated by adding said correlation value on said second replica code to said correlation value on said third replica code with said threshold value supplied from said control device; and said control device detects said timing of said first code by utilizing said comparison output from said comparator.

6. The synchronization detection device according to claim 5, wherein said control device detects said timing of said first code based on a correlation value ratio of said second replica code and third replica code of said synchronization correlation value generated by adding said correlation value on said second replica code to said correlation value on said third replica code.

7. The synchronization detection device according to claim 1, wherein:

said control device causes said correlation coefficient generating device to generate said second replica code, causes said data shift clock to be supplied for a first predetermined period of time to said correlation detecting device, thereby causing said correlation detecting device to detect said correlation value on said second replica code, and sets a value corresponding to a maximum correlation value within said first predetermined period of time as a first threshold value;

said control device causes said correlation coefficient generating device to successively generate third replica codes as third code candidates, and, by judging whether said correlation value outputted from said correlation detecting device exceeds said first threshold value, detects said code type of said third code;

said control device judges whether a synchronization correlation value, which is generated by adding said correlation value on said second replica code to correlation value on said detected third replica code, exceeds a second threshold value, so as to detect said timing of said first code; and said control device causes said data shift clock to be supplied to said correlation detecting device for a second predetermined period of time, thereby causing said correlation detecting device to capture and hold a predetermined length of said received signal, and causes said correlation coefficient generating device to successively generate first replica codes of a group specified by said third code, and said control device detects whether said correlation value outputted from said correlation detecting device exceeds a third threshold value, so as to detect said code type of said first code.

8. The synchronization detection device according to claim 1, wherein said correlation detecting device is a matched filter.

9. A synchronization detecting method for receiving a signal including a first code, a second code for detecting a timing of said first code, and a third code for specifying a group of said first code, and for detecting said timing and said code type of said first code included said received signal, said synchronization detecting method comprising the steps of:

stopping a supply of a data shift clock to a correlation detecting device at a desired timing to hold a received signal; and detecting, respectively, said second code, said third code, and said first code based on a correlation value between one of a first replica code, a second replica code and a third replica code and said received signal by switching said first, said second and said third replica codes at said desired timing so as to detect said timing and said code type of said first code.

10. The synchronization detecting method according to claim 9, further comprising the steps of:

initially generating said second replica code;

supplying said data shift clock to said correlation detecting device to detect said correlation value of said received signal on said second replica code;

judging whether said correlation value exceeds a first threshold value so as to detect said second code;

detecting said timing of said first code;

stopping said supply of said data shift clock to said correlation detecting device to hold said received signal;

successively generating third replica codes as third code candidates;

judging whether said correlation value between said third replica code and said received signal exceeds a second threshold value to detect said code type of said third code;

subsequently supplying said data shift clock to said correlation detecting device for a predetermined period of time to capture and hold a predetermined length of said received signal;

successively generating first replica code of a group specified by said third code; and judging whether said correlation value exceeds a third threshold value to detect a code type of said first code.

11. The synchronization detecting method according to claim 10, wherein said first replica code is a partial code corresponding to said first code, and said code type of said first code is detected by detecting a partial correlation to said first code.

12. The synchronization detecting method according to claim 10, further comprising the step of:

generating a synchronization correlation value by adding said correlation value on said second replica code to said correlation value on said third replica code so as to detect said timing of said first code using said synchronization correlation value.

13. The synchronization detecting method according to claim 12, further comprising the step of:

detecting said timing of said first code based on a correlation value ratio of said second replica code and said third replica code of said synchronization correlation value.

14. The synchronization detecting method according to claim 9, further comprising the steps of:

generating said second replica code;

supplying said data shift clock to said correlation detecting device for a first predetermined period of time to detect said correlation value between said second replica code and said received signal;

setting a value corresponding to a maximum correlation value within said first predetermined period of time;

successively generating third replica codes as third code candidates;

judging whether said correlation value exceeds a first threshold value so as to detect said code type of said third code;

judging whether a synchronization value, which is generated by adding said correlation value on said second replica code to said correlation value on said third replica code, exceeds a second threshold value so as to detect said timing of said first code;

supplying said data shift clock to said correlation detecting device for a second predetermined period of time to capture and hold a predetermined length of said received signal;

successively generating first replica codes of a group specified by said third code; and judging whether said correlation value exceeds a third threshold value so as to detect said code type of said first code.

* * * * *